(12) United States Patent
Sakamoto et al.

(10) Patent No.: US 9,448,689 B2
(45) Date of Patent: Sep. 20, 2016

(54) WEARABLE USER DEVICE ENHANCED DISPLAY SYSTEM

(71) Applicant: PAYPAL, INC., San Jose, CA (US)

(72) Inventors: Ares Sakamoto, Austin, TX (US); Cory Gaines, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 321 days.

(21) Appl. No.: 14/039,918

(22) Filed: Sep. 27, 2013

(65) Prior Publication Data

US 2015/0062160 A1    Mar. 5, 2015

Related U.S. Application Data

(60) Provisional application No. 61/872,041, filed on Aug. 30, 2013.

(51) Int. Cl.
*G06F 3/048*   (2013.01)
*G06F 3/0481*  (2013.01)
*H04N 17/00*   (2006.01)
*G02B 27/01*   (2006.01)

(52) U.S. Cl.
CPC ........ *G06F 3/04815* (2013.01); *H04N 17/002* (2013.01); *G02B 27/017* (2013.01)

(58) Field of Classification Search
CPC  G02B 27/017; G02B 27/01; G02B 27/0172; G02B 2027/0178; G06F 3/011; G06F 3/0481; G06F 3/04815; G06F 17/30873; G06F 17/30994; G06T 19/006

USPC ..................... 715/848, 850; 345/8
See application file for complete search history.

(56) References Cited

U.S. PATENT DOCUMENTS

| | | | | |
|---|---|---|---|---|
| 2010/0150458 A1* | 6/2010 | Angell | ............. | G06F 17/30781 382/224 |
| 2011/0243380 A1* | 10/2011 | Forutanpour | ........... | G06F 3/017 382/103 |
| 2013/0093789 A1* | 4/2013 | Liu | ........................ | G09G 5/377 345/633 |
| 2013/0300636 A1* | 11/2013 | Cunningham | .......... | G10L 13/02 345/8 |
| 2014/0225918 A1* | 8/2014 | Mittal | ..................... | G06F 3/017 345/633 |

* cited by examiner

*Primary Examiner* — Haoshian Shih
(74) *Attorney, Agent, or Firm* — Haynes and Boone, LLP

(57) ABSTRACT

Systems and methods for displaying information on a wearable user device include determining calibration information based on user actions and information from images captured by a camera on a wearable user device. A field of view calibration may then be performed on a display engine in the wearable user device using the calibration information. Graphical information may then be displayed on a display device on the wearable user device according to a user field of view using the display engine in the wearable user. Field of view calibrations may be performed using calibration information that is based on: a user's head range of motion such that displayed graphical information conforms to that head range of motion, calibration objects by themselves that indicate a user's perspective in a user field of view, and calibration objects that allow the size of a user's hands to be determined and used to measure objects.

20 Claims, 35 Drawing Sheets

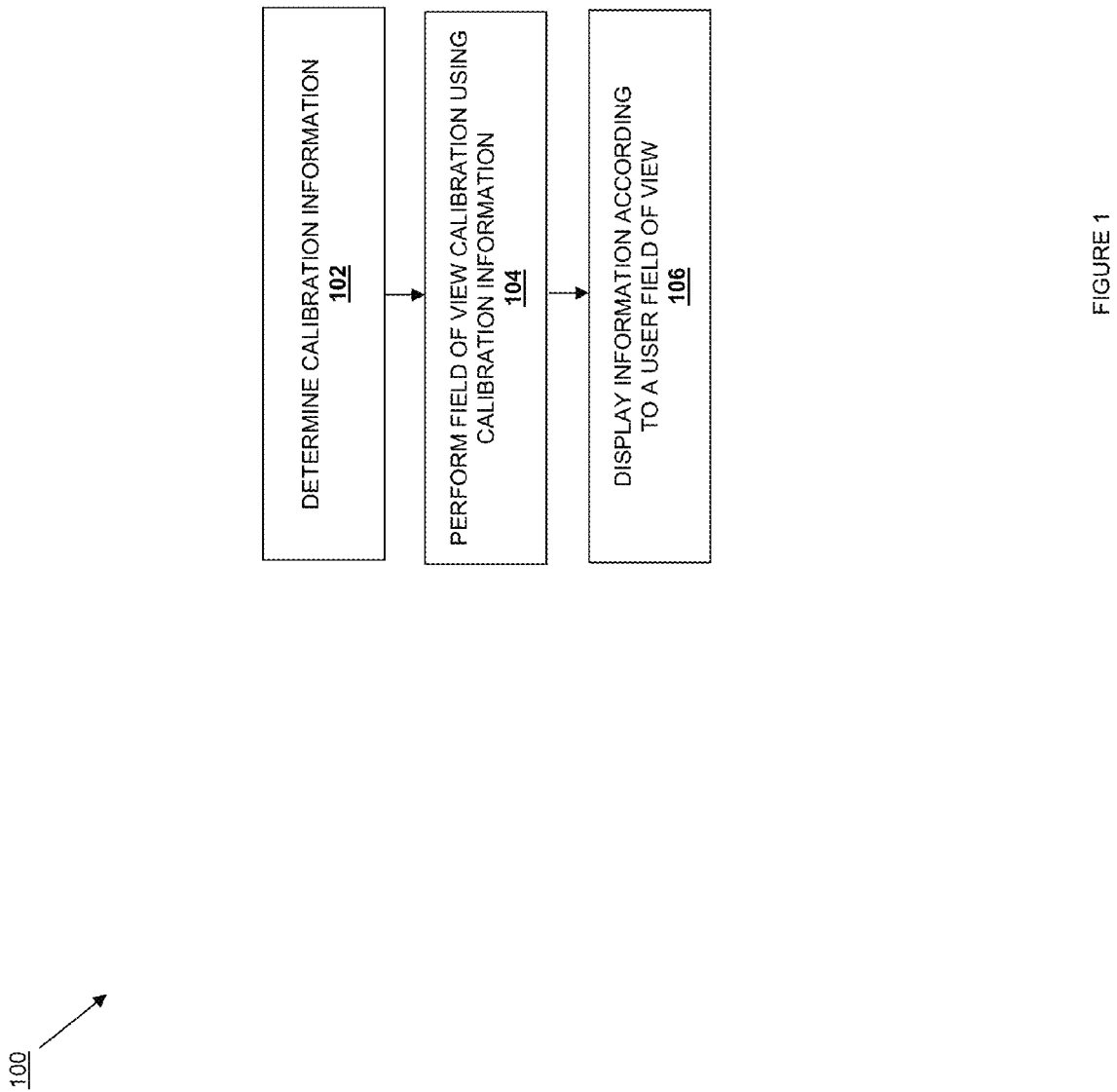

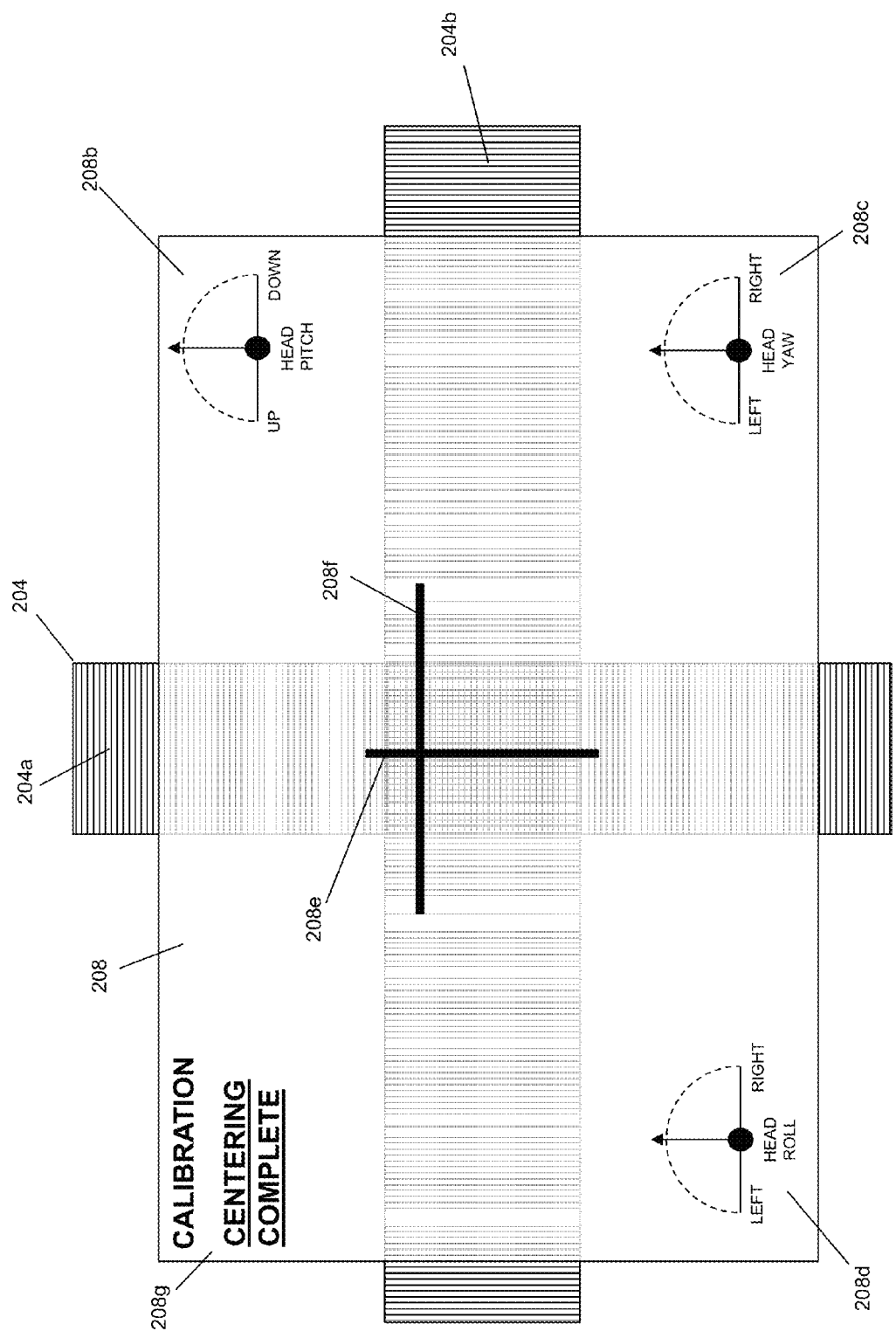

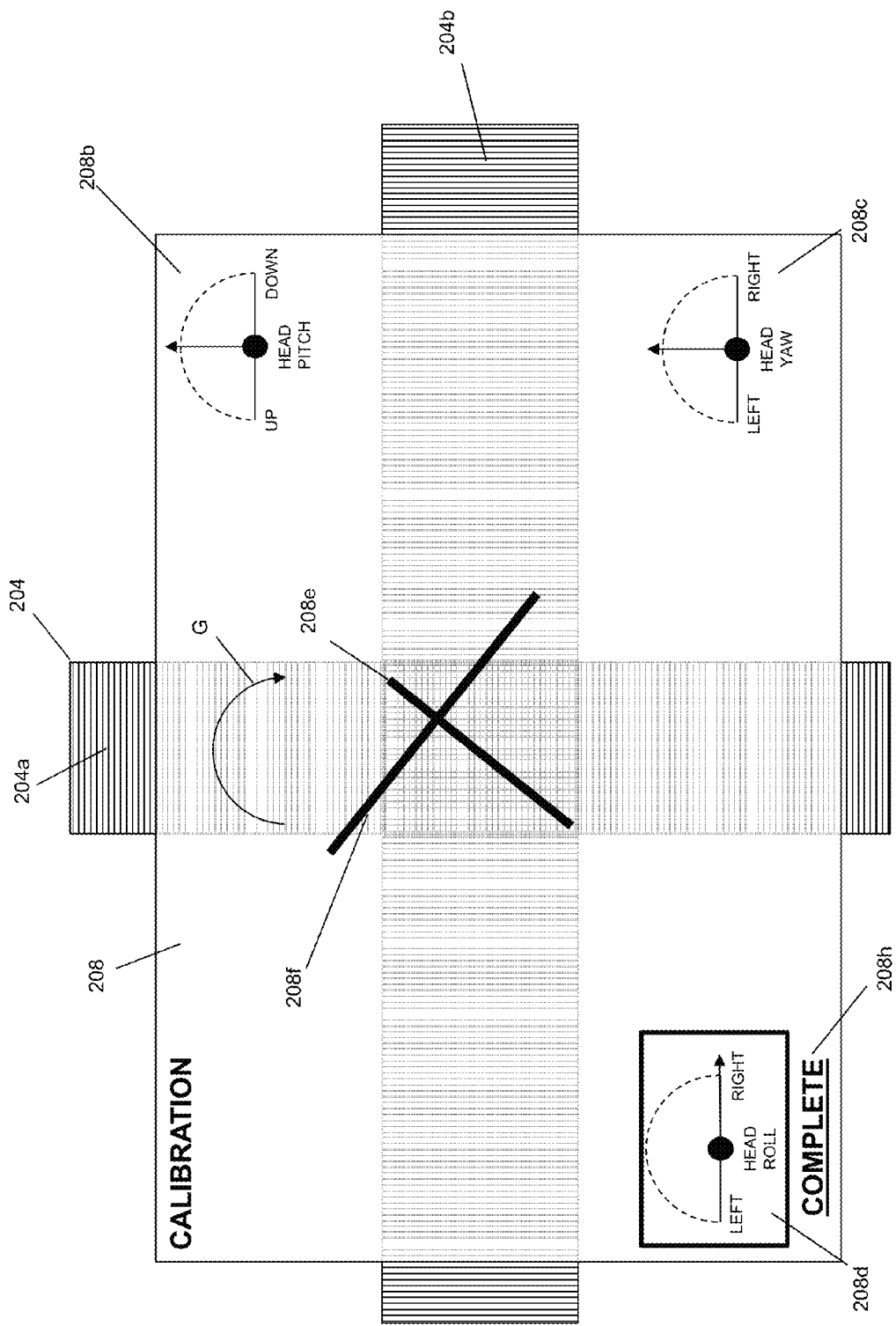

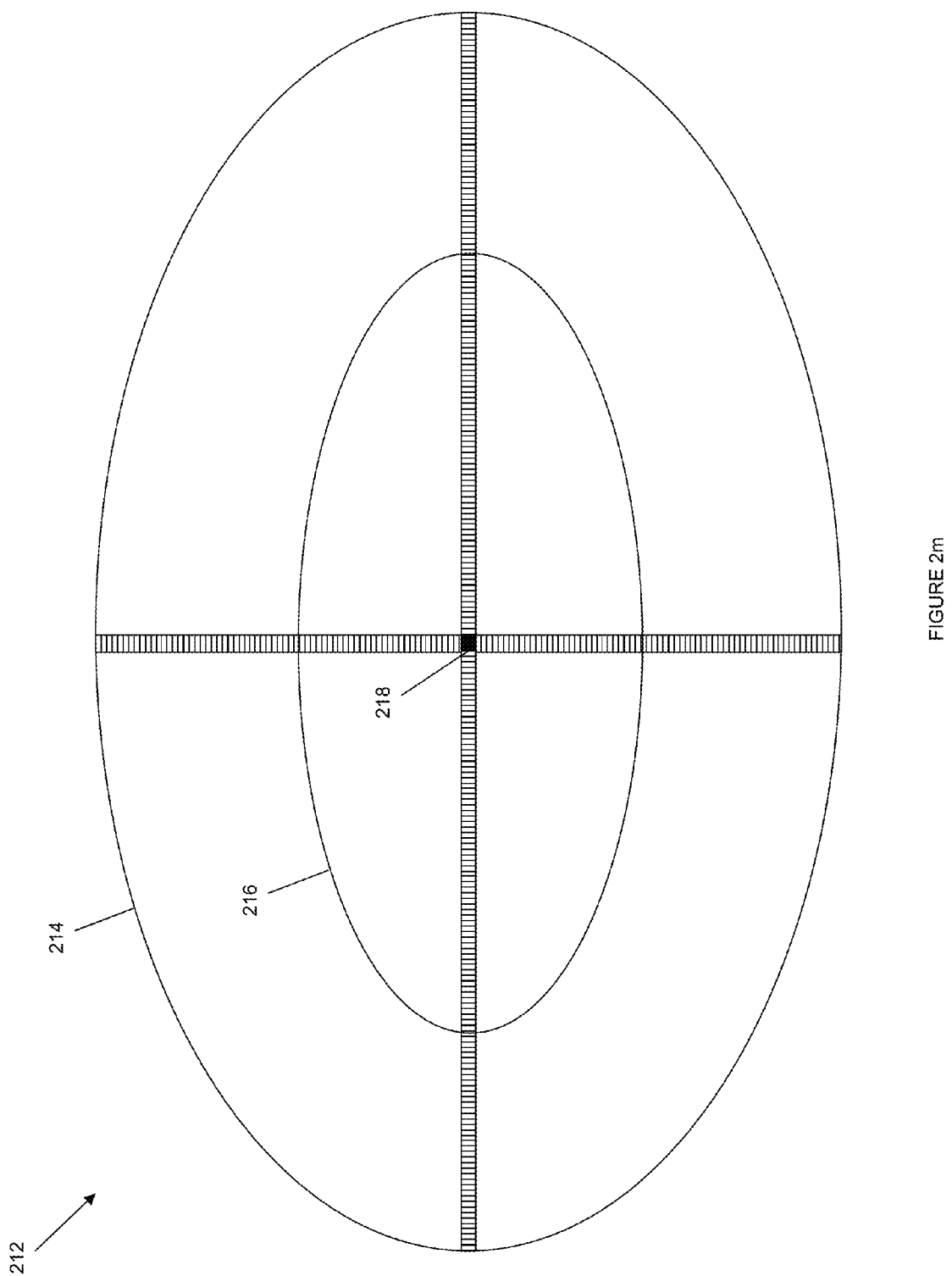

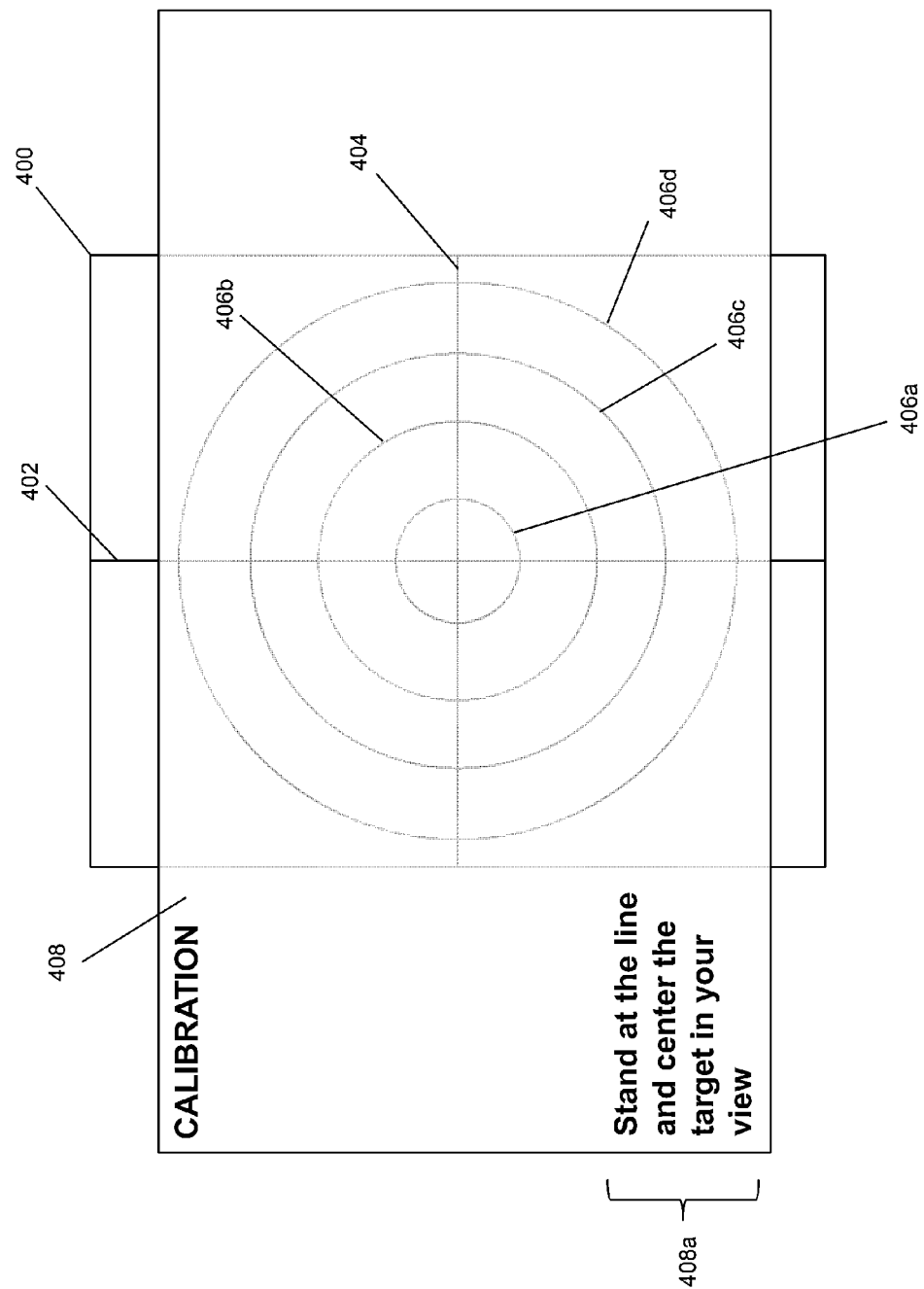

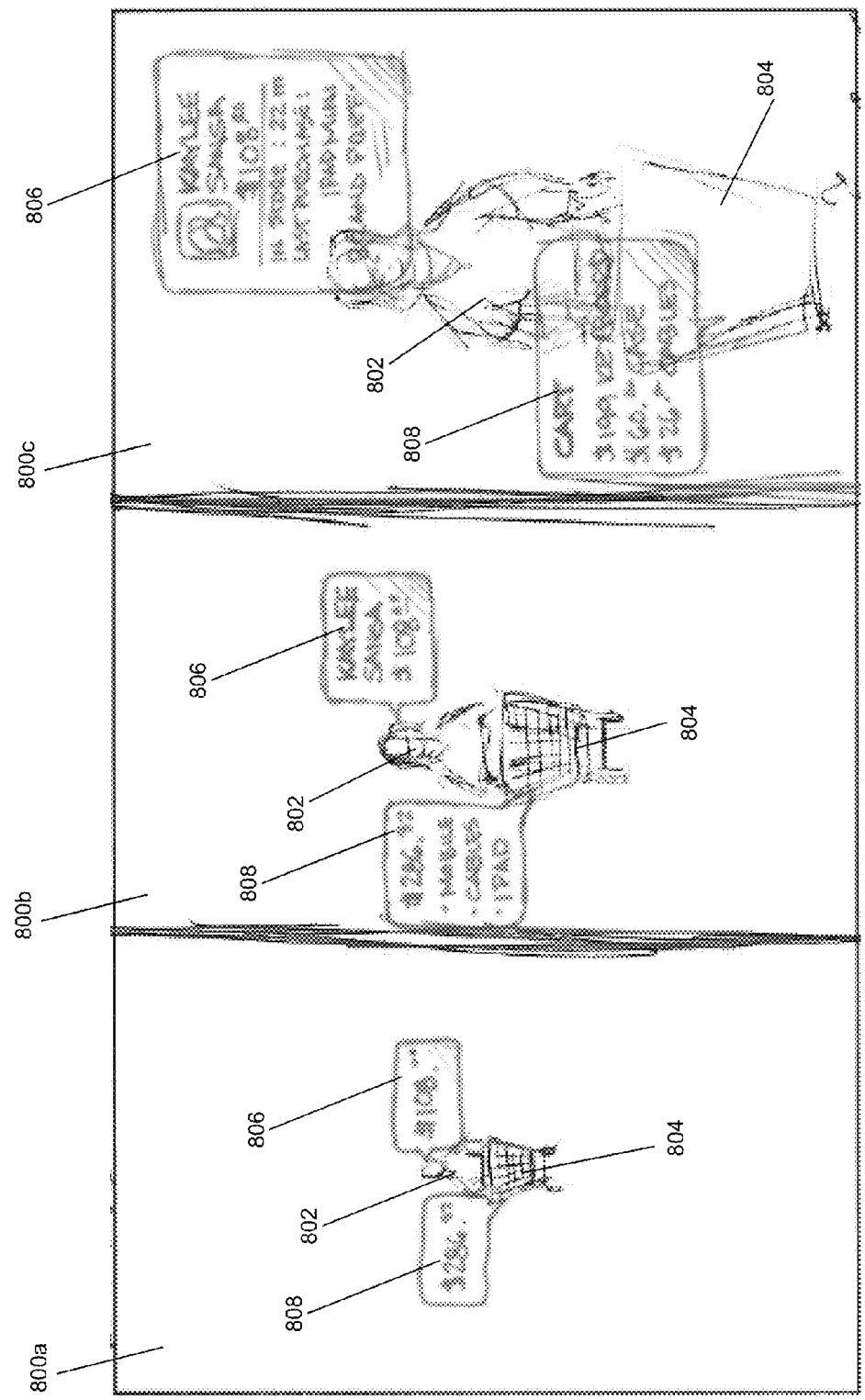

WEARABLE USER DEVICE ENHANCED DISPLAY SYSTEM

CROSS-REFERENCE

This application claims priority to U.S. Provisional Patent Application Ser. No. 61/872,041, filed on Aug. 30, 2013, and entitled "WEARABLE USER DEVICE ENHANCED DISPLAY SYSTEM," the entire disclosure of which is hereby incorporated herein by reference.

BACKGROUND

1. Field of the Invention

The present invention generally relates to wearable user devices and more particularly to a system for providing enhanced display features on a wearable use device.

2. Related Art

Wearable user devices such as, for example, Google Glass® available from Google, Inc. of Mountain View, Calif., may include wearable computing devices that feature a head-mounted display device that is included on a frame, similar to an eyeglass frame, that the user wears on their head such that the display device is viewable in front of at least one eye of the user and between the eye of the user and physical objects the user is viewing. Users of such wearable user devices may interact with the wearable user device to provide instructions by speaking those instructions aloud, and the wearable user device may then use voice recognition techniques to interpret those instructions so that they may be executed by, for example, displaying graphical user interfaces, icons, and/or other information in on the display device such that that information is viewable over the user's field of view. Instructions may also be provided to the wearable user device through a touchpad located on the frame that allows the user to "swipe" through information (e.g., icons) displayed on the display device. However, conventional display techniques for such information on a wearable user device has limited the functionality of wearable user devices, as such conventional techniques do not take into account information about the users field of view.

Thus, there is a need for an improved wearable user device with enhanced display features.

BRIEF DESCRIPTION OF THE FIGURES

FIG. 1 is a flow chart illustrating an embodiment of a method for displaying information on a wearable user device;

FIG. 2b is a screen shot illustrating an embodiment of the provision of calibration information based on the user action of FIG. 2a;

FIG. 2c is a screen shot illustrating an embodiment of the provision of calibration information based on the user action of FIG. 2a;

FIG. 2k is a screen shot illustrating an embodiment of the provision of calibration information based on a user action of FIG. 2j;

FIG. 2l is a screen shot illustrating an embodiment of the provision of calibration information based on a user action of FIG. 2j;

FIG. 2m is a schematic view illustrating an embodiment of a field of view calibration;

FIG. 4a is a screen shot illustrating an embodiment of a user performing a user action to provide calibration information;

FIG. 4b is a screen shot illustrating an embodiment of the provision of calibration information based on a user action of FIG. 4a;

FIG. 8 is a screen shot view illustrating an embodiment of the display of graphical information according to a user field of view;

Figure 2A:
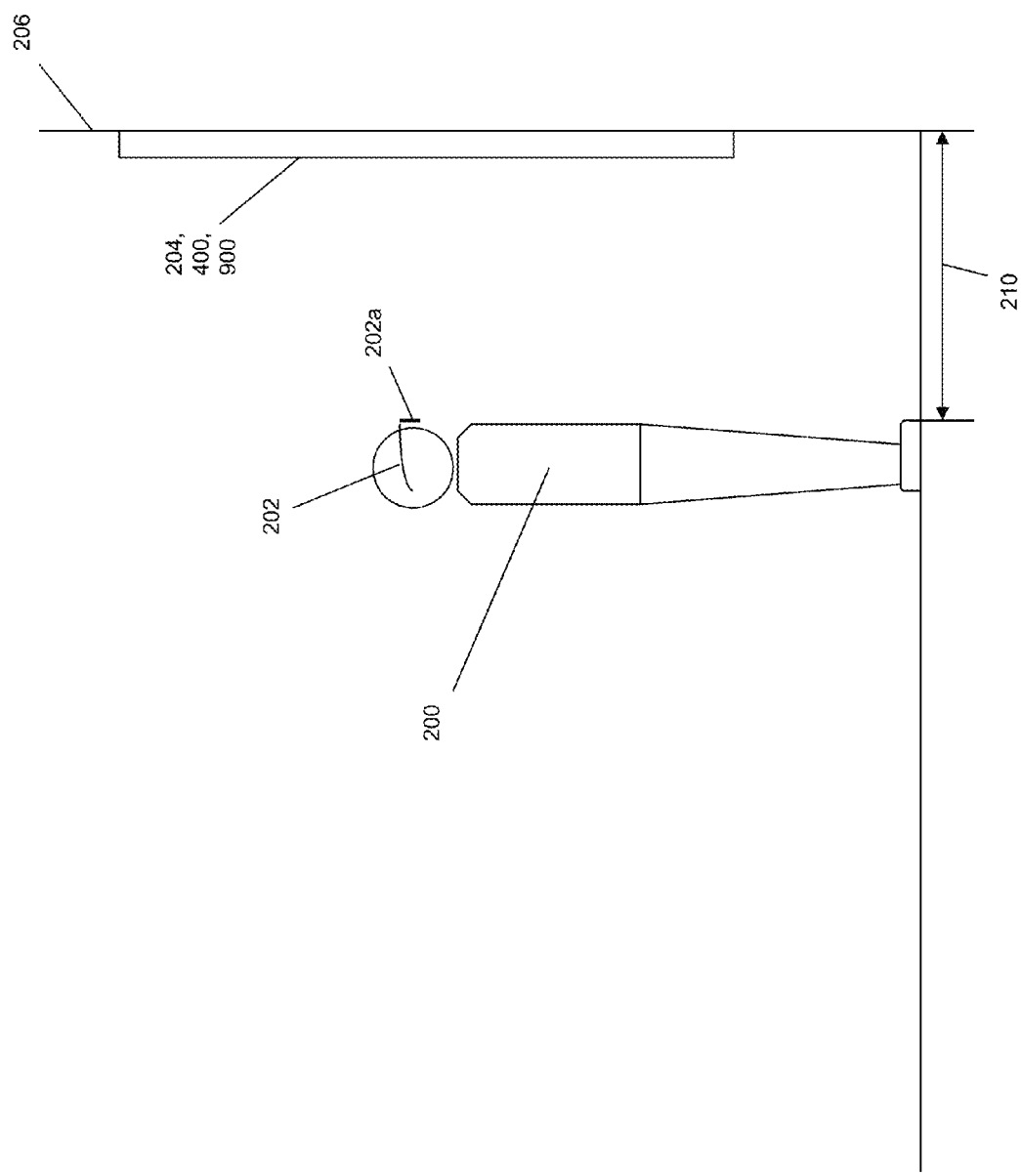
FIG. 2a is a side view illustrating an embodiment of a user performing a user action to provide calibration information.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for enhancing the display of information on a wearable user device by determining calibration information based on, for example, user actions performed in conjunction with information from images captured by a camera on the wearable user device. The calibration information may be used to perform a field of view calibration on a display engine that provides for the display of graphical information on a display device of the wearable user device. Subsequent to the field of view calibration, the display engine may display graphical information on the display device according to a user field of view. One example of a field of view calibration is based upon a range of head motion of the user, and the display of graphical information according to the user field of view may include modifying the size of icons displayed to the user on the display device. Another example of a field of view calibration is based upon a primary calibration object, and the display of graphical information according to the user field of view may include displaying perspective enhanced graphical information using secondary calibration objects that are in the user field of view. Yet another example of a field of view calibration is based upon a user's hands and a calibration object, and the display of graphical information according to the user field of view may include displaying measurement graphical information that includes a determined measurement distance between the user's hands in the user field of view.

Referring now to FIG. 1, an embodiment of a method 100 for providing enhanced display features on a wearable user device is illustrated. Generally, the method 100 includes determining calibration information at block 102, performing a field of view calibration using the calibration information at block 104, and displaying information according to a user field of view at block 106. In some of the embodiments discussed below, the calibration information is determined based on at least one user action and information from at least one image captured by a camera on the wearable user device. However, other calibration techniques may be utilized that will enable the field of view calibration and thus will fall within the scope of the present disclosure. Furthermore, while the embodiments discussed below discuss the display of graphical information according to the user field of view, the display of information other than purely graphical information is envisioned as falling within the scope of the present disclosure (e.g., different types (e.g., size, font, and/or other text characteristics) of alphanumeric text may fall within the scope of graphical information). Thus, while a variety of specific examples are illustrated and described below, one of skill in the art in possession of the present disclosure will recognize that a wide variety of modifications to those specific examples will fall within the scope of the present disclosure.

Figure 2B:
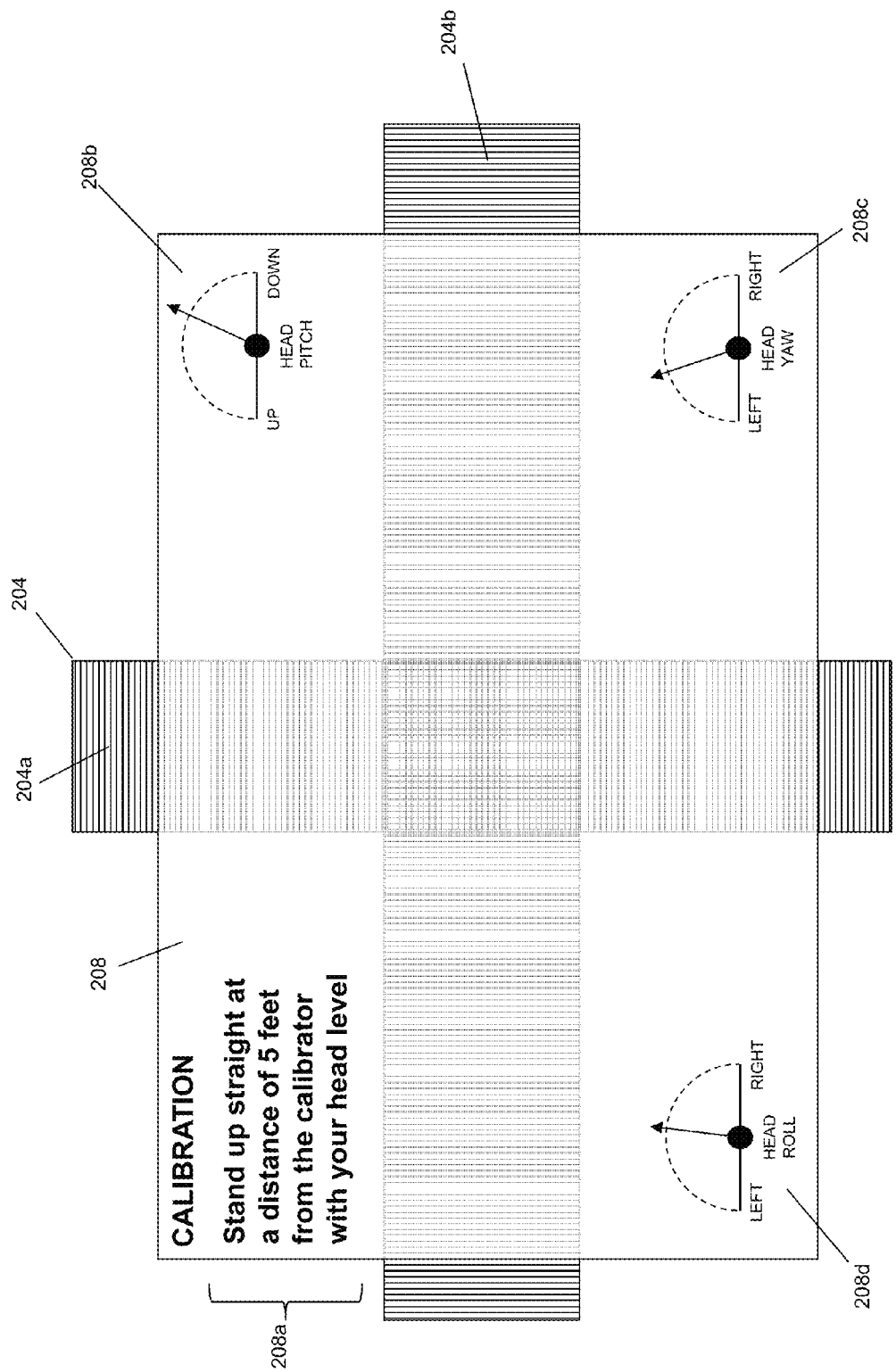

Referring first to FIGS. 2a-2l, a few embodiments for determining calibration information at block 102 of the method 100 are illustrated. In the embodiments illustrated in FIGS. 2a-2l, different ranges of head motion of a user are determined as calibration information and, as discussed in further detail below, may be utilized for adjusting the display of graphical information to the user based on that user's range of head motion/field of view. Referring initially to FIGS. 2a and 2b, a user 200 is wearing a wearable user device 202 that includes a display device 202a that is positioned in front of one or more of the user's eyes. As discussed in further detail below, the wearable user device 202 includes a non-transitory memory having instruction that, when executed by one or more hardware processors in the wearable user device 202, cause the one or more hardware processors to provide a display engine that performs the functions of the wearable user device 202 discussed herein.

At block 102, the user 200 may approach a calibrator 204 that, in the illustrated embodiments, is positioned on a wall 206 and includes a vertical calibrator portion 204a and a horizontal calibrator portion 204b. In response to recognizing the calibrator 204 (e.g., using image recognition techniques), an instruction received from the user, or to a variety of other calibration initiation instructions known in the art, the display engine in the wearable user device 202 may provide a calibration screen 208, illustrated in FIG. 2b, on the display device 202a. In the illustrated embodiment, the calibration screen 208 includes a calibration instruction 208a that instructs the user to stand a distance from the calibrator 204 with their head level, but any variety of calibration techniques may be provided and result in any appropriate calibration instruction for that calibration technique. The calibration screen 208 also includes a plurality of head orientation indicators including, in the illustrated embodiment, a head pitch indicator 208b, a head yaw indicator 208c, and a head roll indicator 208d. In an embodiment, a gyroscope or other orientation determination device in the wearable user device 202 operates to determine orientation information related to the user's head, and that orientation information may be reported by the display engine in the indicators 208c-d on the calibration screen 208.

In an embodiment of block 102, the user 200 stands at a distance 210 from the wall 206 and/or calibrator 204 (e.g., 5 feet in the illustrated embodiment) and positions their head until it is substantially level such that each of the head pitch indicator 208b, head yaw indicator 208c, and head roll indicator 208d on the calibration screen 208 are "zeroed out", as illustrated in FIG. 2c. In response to receiving the orientation information from the orientation determination device in the wearable user device 202 that results in the display engine providing the zeroed out indicators 208b-d, the display engine may save that zeroed out orientation information as calibration information. In the illustrated embodiment, the display engine has provided calibration information lines for the zeroed out orientation information on the calibration screen 208, including a vertical calibration information line 208e and a horizontal calibration information line 208f, along with a "centering complete" indicator 208g that indicates to the user 200 that the centering portion of the calibration procedure is complete. In an embodiment, the vertical calibration information line 208*e* and the horizontal calibration information line 208*f* are provided based on the user action of the user 200 standing a predetermined distance from the calibrator 204 with their head level, along with the images captured of the calibrator 204 by a camera on the wearable user device 202. Furthermore, if the size of the calibrator is known or retrievable by the wearable user device 202, given the known distance 210, the wearable user device may perform a distance calibration similarly as discussed below with reference to FIGS. 4*a* and 4*b*.

As discussed in further detail below, the zeroing out calibration operations illustrated in FIGS. 2*a-c* provide a number of benefits for the wearable user device enhanced display system described herein. For example, the zeroing out calibration options provide a reference point for a viewing height of the user 200 (e.g., the horizontal calibration line 208*f*), and can be used in making measurements in the field of view of the user 200, rendering perspective enhanced graphics, and determining what is within a viewing range of the user 200. In some embodiments, the calibrator 204 may include measurement indicators, such as the lines on the vertical calibrator portion 204*a* and horizontal calibrator portion 204*b* of the calibrator 204 that are illustrated in FIGS. 2*b* and 2*c*, that may include any unit of measurement known in the art (e.g., inches, centimeters, etc.). In other embodiments, the calibrator 204 may simply include an image that is recognizable to the display engine, and the display engine may use previously received information about the user 200 (e.g., a height of the user 200), the calibrator, and/or other reference information to perform the zeroing out operations discussed above.

Figure 2D:
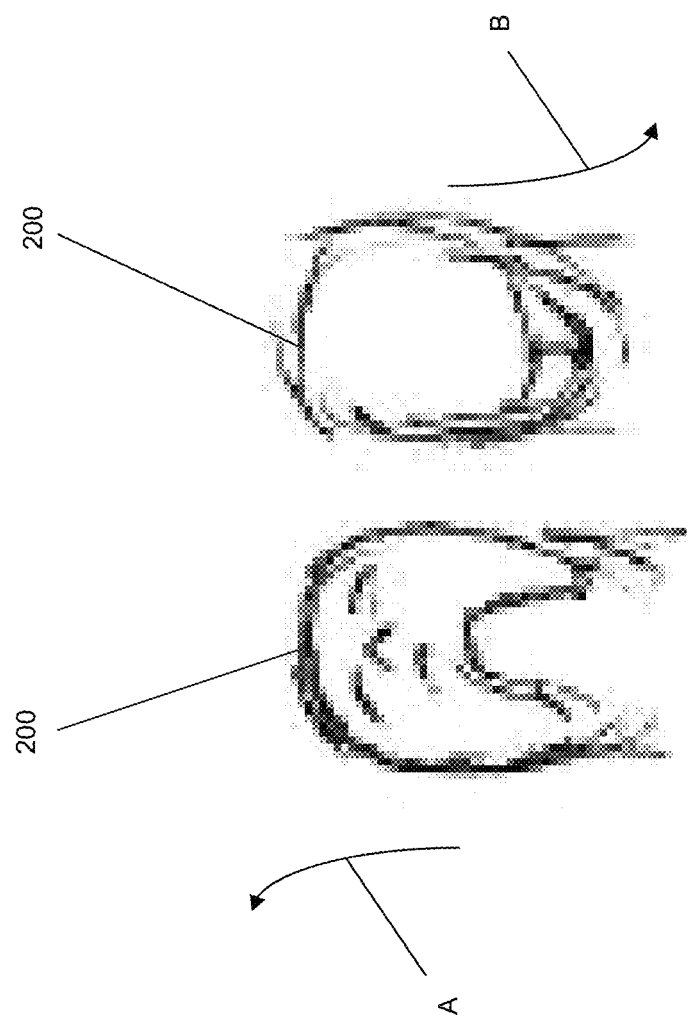
FIG. 2d is a front view illustrating an embodiment of a user performing user actions to provide calibration information.
Figure 2E:
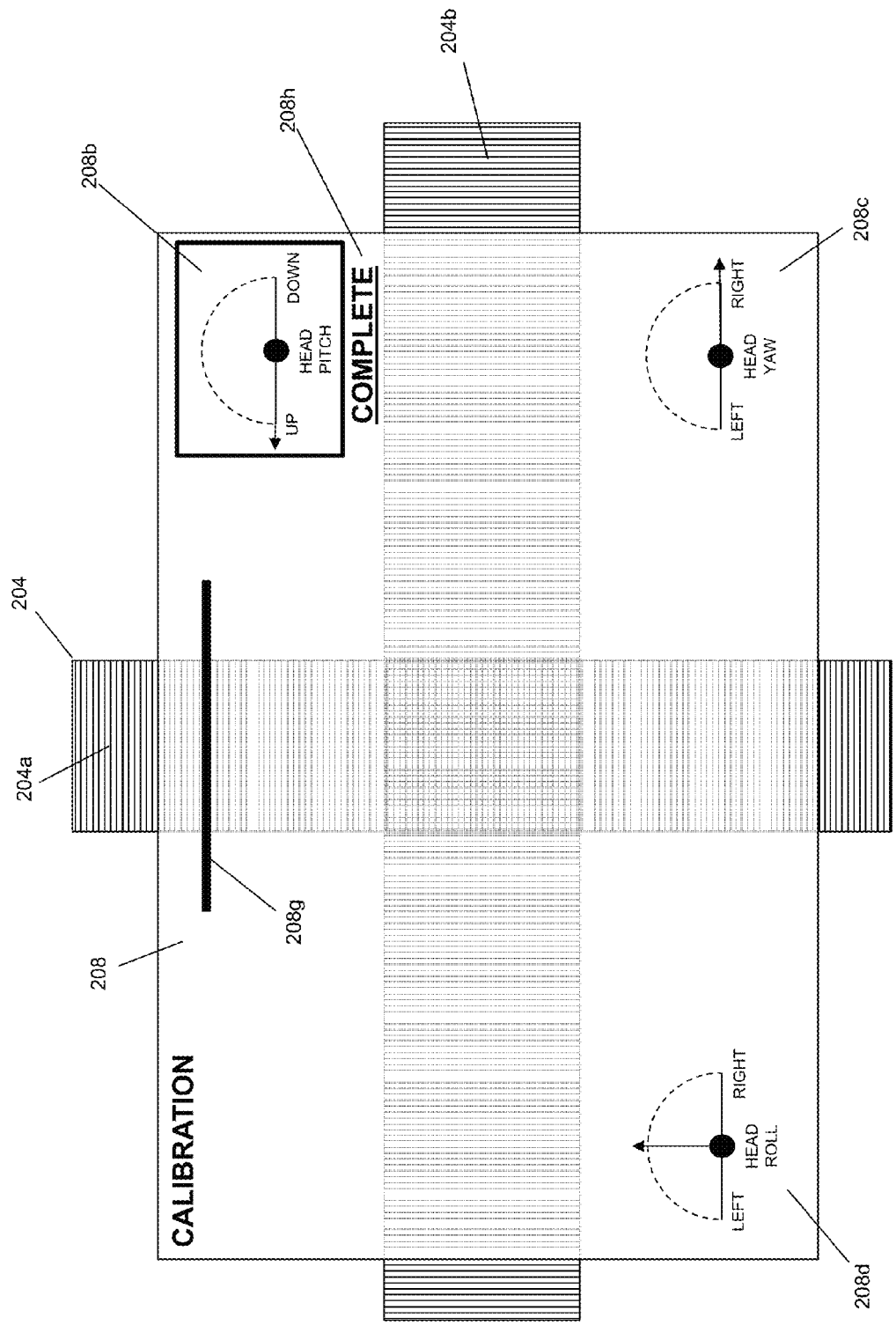
FIG. 2e is a screen shot illustrating an embodiment of the provision of calibration information based on a user action of FIG. 2d.
Figure 2F:
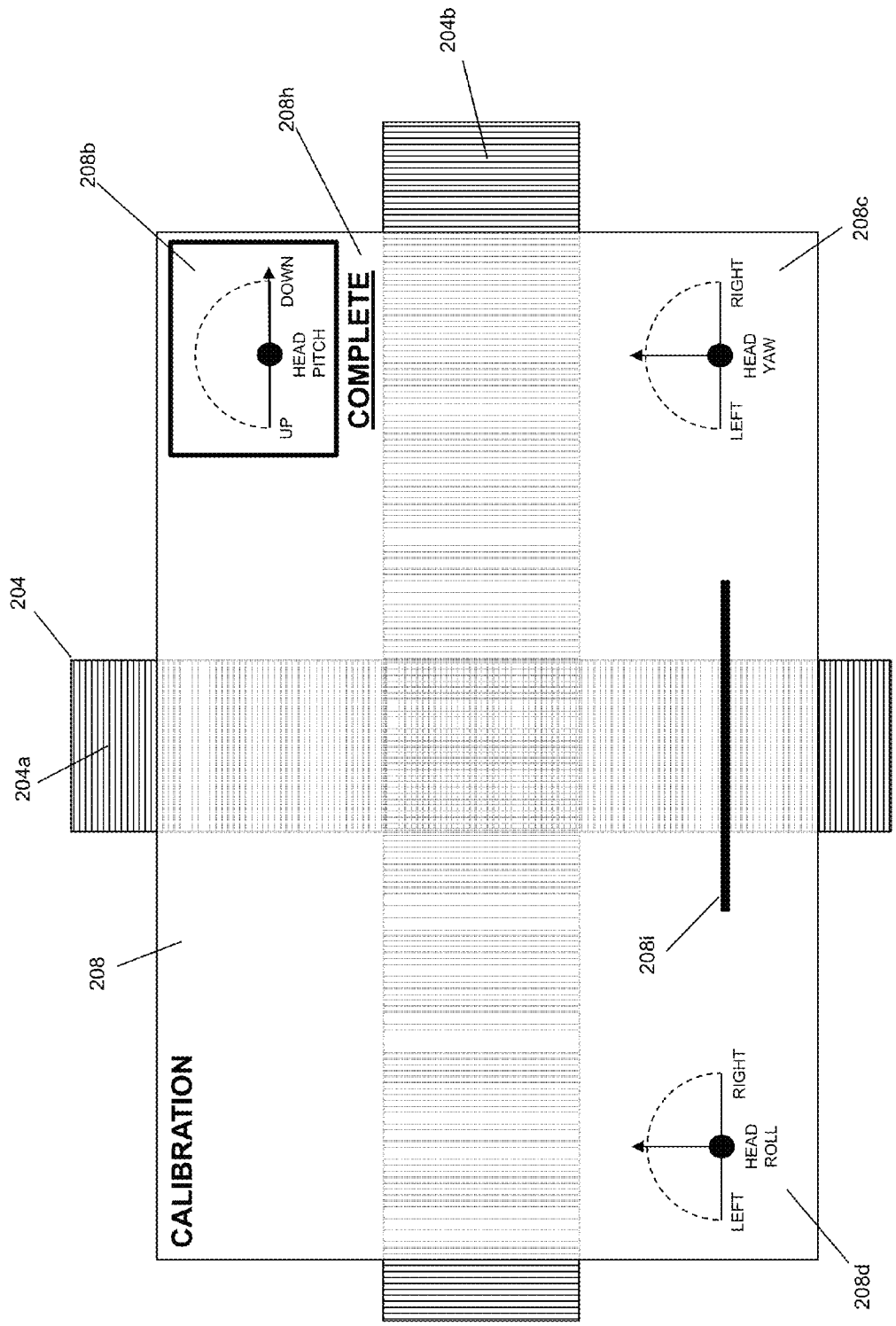
FIG. 2f is a screen shot illustrating an embodiment of the provision of calibration information based on a user action of FIG. 2d.

Referring now to FIGS. 2*d*, 2*e*, and 2*f*, embodiments for determining calibration information at block 102 of the method 100 are illustrated. The embodiments illustrated in FIGS. 2*d-f* may follow the zeroing out operations discussed above with reference to FIGS. 2*a-c*. In one example, the display engine may display a calibration screen that is similar to the calibration screen illustrated in FIG. 2*b*, but that instructs the user to pitch their head up and then down as far as they can while standing in front of the calibrator 204, illustrated in FIG. 2*a*, in order provide calibration information for head pitch. As illustrated in FIG. 2*d*, the user 200 may pitch their head up by moving their head in a direction A as far as they can, followed by pitching their head down by moving their head in a direction B as far as they can. In an embodiment, the crossed vertical calibration line 208*e* and horizontal calibration line 208*f* illustrated in FIG. 2*c* may be provided on the display device 202*a* such they do not move relative to the display device 202*a*. This may be done to provide a target for the user 200 to view as they pitch their head through its range of motion such that the eyes of the user remain focused on a point of the display device 202*a* throughout the head pitch calibration.

Referring now to FIG. 2*e*, an embodiment of the calibration screen 208 is illustrated that is provided by the display engine at the first end of a head range of motion of the user 200. For example, the orientation determination device in the wearable user device 202 may provide the display engine with orientation information that the head of the user is performing a pitching motion, and as that pitching motion slows to a stop, the display engine may determine calibration information that includes the first end of the range of head pitch of the user 200 (illustrated in FIG. 2*d* with the user having moved their head in the direction A). In response to determining the first end of the range of head pitch of the user 200, the display engine provides the head pitch indicator 208*b* maxed out to the "up" pitch, and saves that first end of the range of head pitch as calibration information. In the illustrated embodiment, the display engine has provided a horizontal calibration information line 208*g* for the first end of the range of head pitch on the calibration screen 208, along with a "complete" indicator 208*h* that indicates to the user 200 that the first end of the head pitch calibration is complete. In an embodiment, the horizontal calibration information line 208*g* is provided based on the user action of pitching their head up as far as they can, along with the images captured of the calibrator 204 by the camera on the wearable user device 202 (e.g., at the end of the range of motion).

Referring now to FIG. 2*f*, an embodiment of the calibration screen 208 is illustrated that is provided by the display engine at the second end of a head range of motion of the user 200. For example, the orientation determination device in the wearable user device 202 may provide the display engine with orientation information that the head of the user 200 is performing a pitching motion, and as that pitching motion slows to a stop, the display engine may determine calibration information that includes the second end of the range of head pitch of the user 200 (illustrated in FIG. 2*e* with the user 200 having moved their head in the direction B). In response to determining the second end of the range of head pitch of the user 200, the display engine provides the head pitch indicator 208*b* maxed out to the "down" pitch, and saves that second end of the range of head pitch as calibration information. In the illustrated embodiment, the display engine has provided a horizontal calibration information line 208*i* for the second end of the range of head pitch on the calibration screen 208, along with the "complete" indicator 208*h* that indicates to the user 200 that the second end of the head pitch calibration is complete. In an embodiment, the horizontal calibration information line 208*i* is provided based on the user action of pitching their head down as far as they can, along with the images captured of the calibrator 204 by a camera on the wearable user device 202 (e.g., at the end of the range of motion).

Figure 2G:
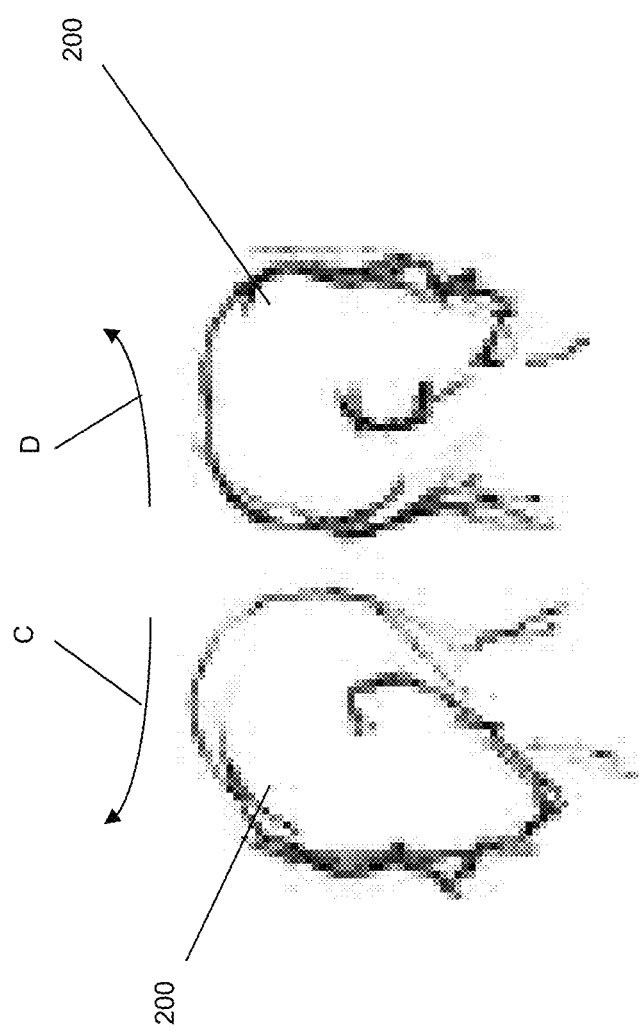
FIG. 2g is a front view illustrating an embodiment of a user performing user actions to provide calibration information.
Figure 2H:
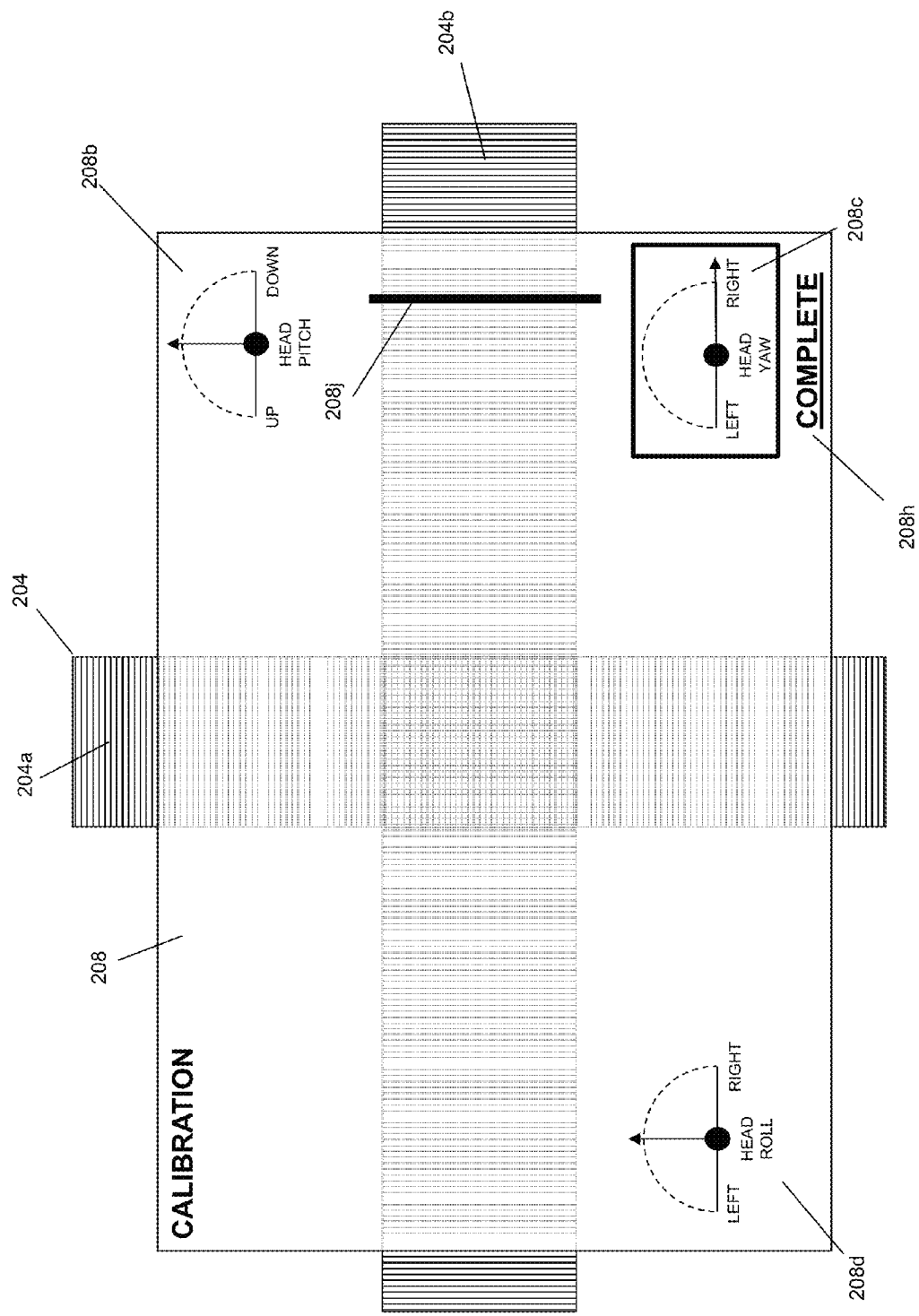
FIG. 2h is a screen shot illustrating an embodiment of the provision of calibration information based on a user action of FIG. 2g.
Figure 2I:
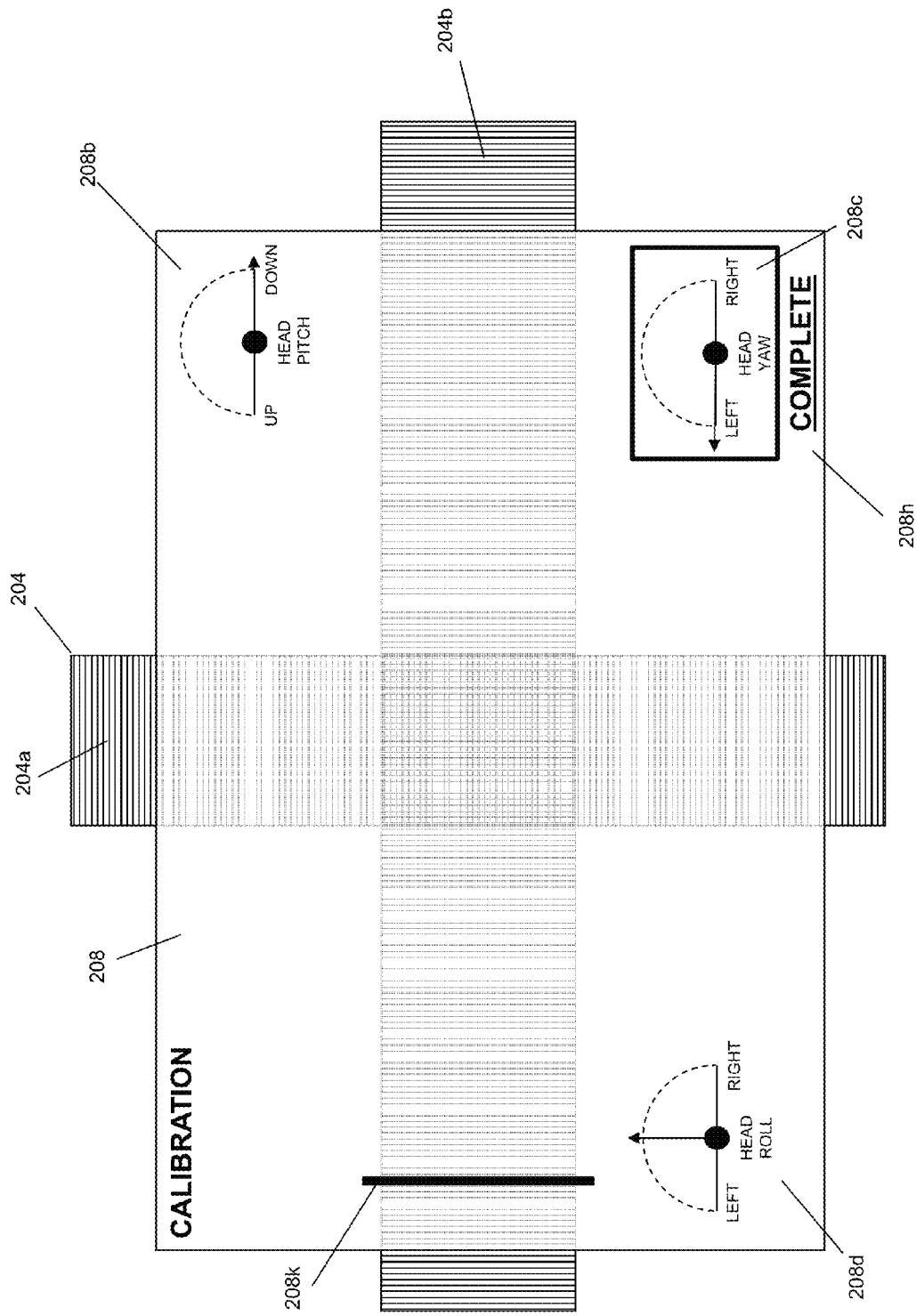
FIG. 2i is a screen shot illustrating an embodiment of the provision of calibration information based on a user action of FIG. 2g.

Referring now to FIGS. 2*g*, 2*h*, and 2*i*, embodiments for determining calibration information at block 102 of the method 100 are illustrated. The embodiments illustrated in FIGS. 2*g-i* may follow the zeroing out operations discussed above with reference to FIGS. 2*a-c*. In one example, the display engine may display a calibration screen that is similar to the calibration screen illustrated in FIG. 2*b*, but that instructs the user to yaw their head right and then left as far as they can while standing in front of the calibrator 204, illustrated in FIG. 2*a*, in order provide calibration information for head yaw. As illustrated in FIG. 2*g*, the user 200 may yaw their head right by moving their head in a direction C as far as they can, followed by yawing their head left by moving their head in a direction D as far as they can. In an embodiment, the crossed vertical calibration line 208*e* and horizontal calibration line 208*f* illustrated in FIG. 2*c* may be provided on the display device 202*a* such they do not move relative to the display device 202*a*. This may be done to provide a target for the user 200 to view as they yaw their head through its range of motion such that the eyes of the user remain focused on a point of the display device 202*a* throughout the head yaw calibration.

Referring now to FIG. 2*h*, an embodiment of the calibration screen 208 is illustrated that is provided by the display engine at the first end of a head range of motion of the user 200. For example, the orientation determination device in the wearable user device 202 may provide the display engine with orientation information that the head of the user 200 is performing a yawing motion, and as that yawing motion slows to a stop, the display engine may determine calibration information that includes the first end of the range of head yaw of the user 200 (illustrated in FIG. 2d with the user 200 having moved their head in the direction C). In response to determining the first end of the range of head yaw of the user 200, the display engine provides the head yaw indicator 208c maxed out to the "right" yaw, and saves that first end of the range of head yaw as calibration information. In the illustrated embodiment, the display engine has provided a vertical calibration information line 208j for the first end of the range of head yaw on the calibration screen 208, along with the "complete" indicator 208h that indicates to the user 200 that the first end of the head yaw calibration is complete. In an embodiment, the vertical calibration information line 208j is provided based on the user action of yawing their head right as far as they can, along with the images captured of the calibrator 204 by a camera on the wearable user device 202 (e.g., at the end of the range of motion).

Referring now to FIG. 2i, an embodiment of the calibration screen 208 is illustrated that is provided by the display engine at the second end of a head range of motion of the user 200. For example, the orientation determination device in the wearable user device 202 may provide the display engine with orientation information that the head of the user 200 is performing a yawing motion, and as that yawing motion slows to a stop, the display engine may determine calibration information that includes the second end of the range of head yaw of the user 200 (illustrated in FIG. 2e with the user 200 having moved their head in the direction D). In response to determining the second end of the range of head yaw of the user 200, the display engine provides the head yaw indicator 208c maxed out to the "left" yaw, and saves that second end of the range of head yaw as calibration information. In the illustrated embodiment, the display engine has provided a vertical calibration information line 208k for the second end of the range of head yaw on the calibration screen 208, along with the "complete" indicator 208h that indicates to the user 200 that the second end of the head yaw calibration is complete. In an embodiment, the vertical calibration information line 208k is provided based on the user action of yawing their head left as far as they can, along with the images captured of the calibrator 204 by a camera on the wearable user device 202 (e.g., at the end of the range of motion).

Figure 2J:
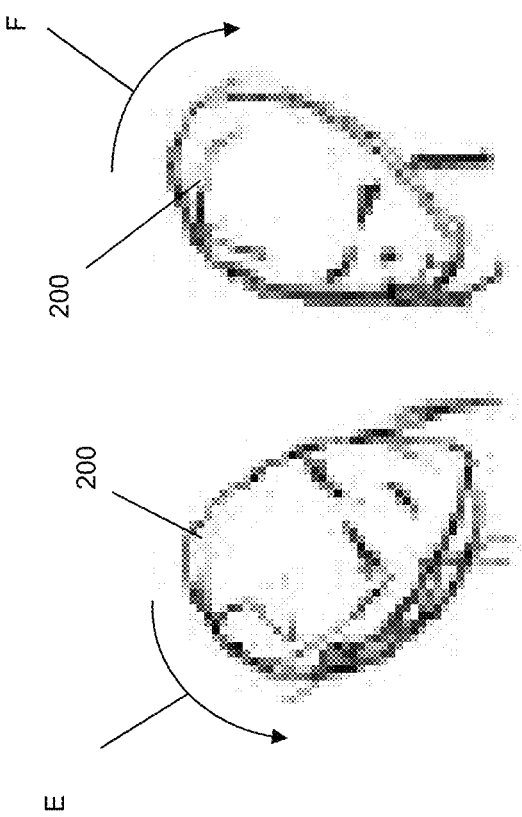
FIG. 2j is a front view illustrating an embodiment of a user performing user actions to provide calibration information.
Figure 2I:
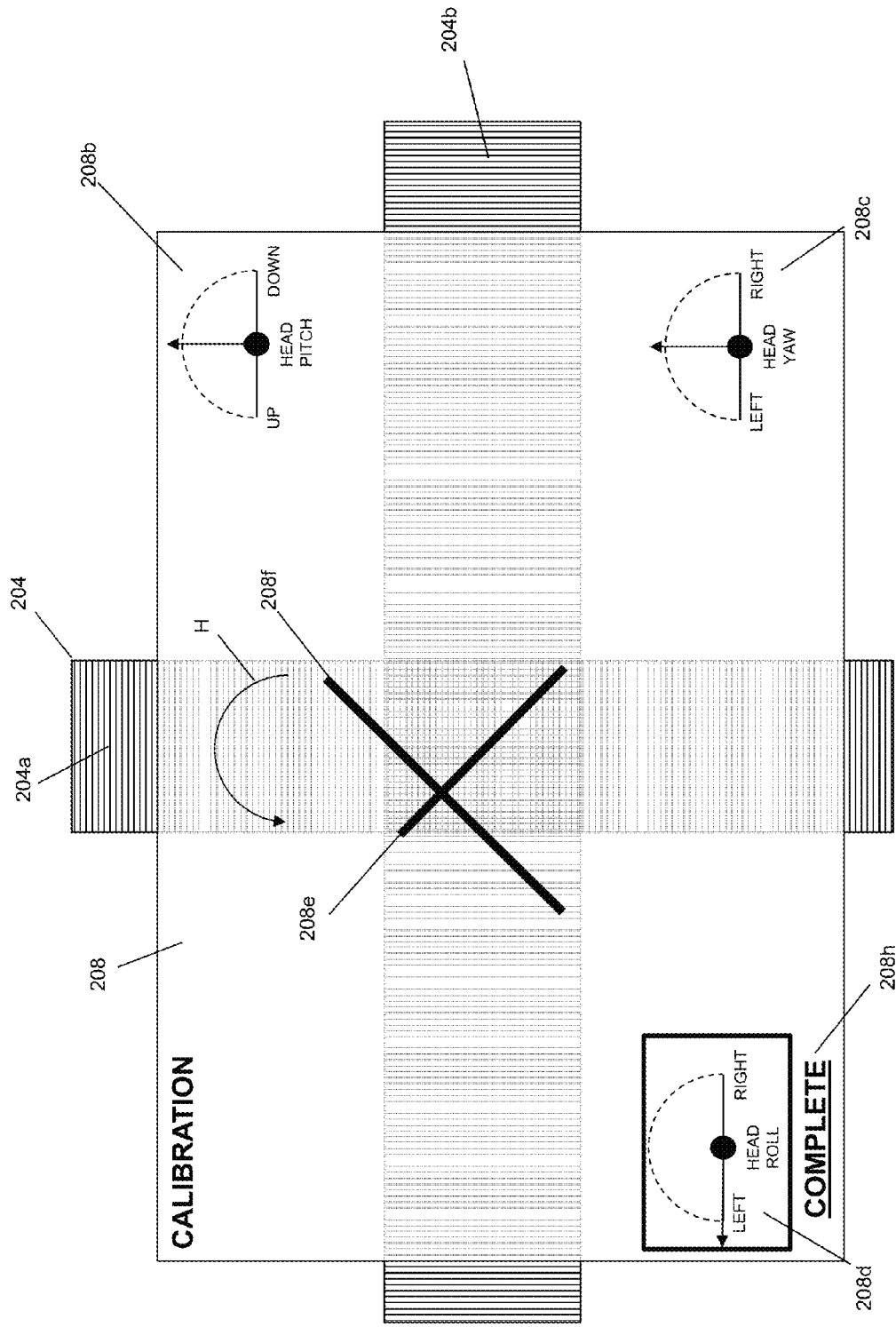

Referring now to FIGS. 2j, 2k, and 2l, embodiments for determining calibration information at block 102 of the method 100 are illustrated. The embodiments illustrated in FIGS. 2j-l may follow the zeroing out operations discussed above with reference to FIGS. 2a-c. In one example, the display engine may display a calibration screen that is similar to the calibration screen illustrated in FIG. 2b, but that instructs the user 200 to roll their head right and then left as far as they can while standing in front of the calibrator 204, illustrated in FIG. 2a, in order provide calibration information for head roll. As illustrated in FIG. 2j, the user 200 may roll their head right by moving their head in a direction E as far as they can, followed by rolling their head left by moving their head in a direction F as far as they can. In an embodiment, the crossed vertical calibration line 208e and horizontal calibration line 208f illustrated in FIG. 2c may be provided on the display device 202a such they do not move relative to the display device 202a. This may be done to provide a target for the user 200 to view as they roll their head through its range of motion such that the eyes of the user remain focused on a point of the display device 202a throughout the head roll calibration.

Referring now to FIG. 2k, an embodiment of the calibration screen 208 is illustrated that is provided by the display engine at the first end of a head range of motion of the user 200. For example, the orientation determination device in the wearable user device 202 may provide the display engine with orientation information that the head of the user 200 is performing a rolling motion, and as that rolling motion slows to a stop, the display engine may determine calibration information that includes the first end of the range of head roll of the user 200 (illustrated in FIG. 2j with the user 200 having moved their head in the direction E). In response to determining the first end of the range of head roll of the user 200, the display engine provides the head roll indicator 208d maxed out to the "right" roll, and saves that first end of the range of head roll as calibration information. In the illustrated embodiment, the display engine has provided the horizontal and vertical calibration information lines 208e and 208f, discussed above with reference to FIG. 2c, rotated in a direction G for the first end of the range of head roll on the calibration screen 208, along with the "complete" indicator 208h that indicates to the user 200 that the first end of the head roll calibration is complete. In an embodiment, the vertical calibration information line 208e and the horizontal calibration information line 208f rotated in the direction G are provided based on the user action of rolling their head right as far as they can, along with the images captured of the calibrator 204 by a camera on the wearable user device 202 (e.g., at the end of the range of motion).

Referring now to FIG. 2l, an embodiment of the calibration screen 208 is illustrated that is provided by the display engine at the second end of a head range of motion of the user 200. For example, the orientation determination device in the wearable user device 202 may provide the display engine with orientation information that the head of the user 200 is performing a rolling motion, and as that rolling motion slows to a stop, the display engine may determine calibration information that includes the second end of the range of head roll of the user 200 (illustrated in FIG. 2e with the user 200 having moved their head in the direction F). In response to determining the second end of the range of head roll of the user 200, the display engine provides the head roll indicator 208d maxed out to the "left" roll, and saves that second end of the range of head roll as calibration information. In the illustrated embodiment, the display engine has provided the horizontal and vertical calibration information lines 208e and 208f, discussed above with reference to FIG. 2c, rotated in a direction H for the second end of the range of head roll on the calibration screen 208, along with the "complete" indicator 208h that indicates to the user 200 that the second end of the head roll calibration is complete. In an embodiment, the vertical calibration information line 208e and the horizontal calibration information line 208f rotated in the direction H are provided based on the user action of rolling their head left as far as they can, along with the images captured of the calibrator 204 by a camera on the wearable user device 202 (e.g., at the end of the range of motion).

Thus, following the calibration operations illustrated and described with reference to FIGS. 2a-l, the display engine in the wearable user device 202 may have stored calibration information that details a range of head motion for the user 200. As detailed above, the range of head motion of the user may be determined by user performing user actions that include pitching, yawing, and rolling their head, along with information from images captured by a camera on the wearable user device of the calibrator 204. However, other techniques may be used to determine the range of head motion of a user.

The method 100 may then proceed to block 104 where a field of view calibration is performed using the calibration information determined in block 102. Referring now to FIG. 2m, a schematic view of an embodiment of a field of view calibration 212 is illustrated. The embodiment illustrated in FIG. 2m is intended to schematically represent multiple user fields of view that may be determined by the display engine in the wearable user device 202 using range of head motion calibration discussed above. In the illustrated embodiment, the field of view calibration 212 includes a "normal" user field of view 214 and a "restricted" user field of view 216 both plotted on a vertical and horizontal scale 218 to illustrate the relative differences between those user fields of view. For example, the normal user field of view 214 may be determined by performing the field of view calibration on the display engine for a user that has a normal range of head motion (i.e., no restrictions in head pitch, yaw, and/or roll movement), while the restricted user field of view 216 may be determined by performing the field of view calibration on the display engine for a user that has a restricted range of head motion relative to the normal range of head movement (i.e., restrictions in head pitch, yaw, and/or roll movement). As can be seen by comparing the normal user field of view 214 and the restricted user field of view 216 relative to the vertical and horizontal scale 218, the field of view calibration 212 provide the display engine (e.g., programs the display engine with information about) the limits of the user's ability to view information displayed on the display device 202a by pitching, yawing, and rolling their head. As discussed in further detail below, the display of information on the display device 202a of the wearable user device 202 may change based on a user's range of head motion such that the display engine will display information differently for a user with the normal user field of view 214 relative to a user with the restricted field of view 216.

Figure 3A:
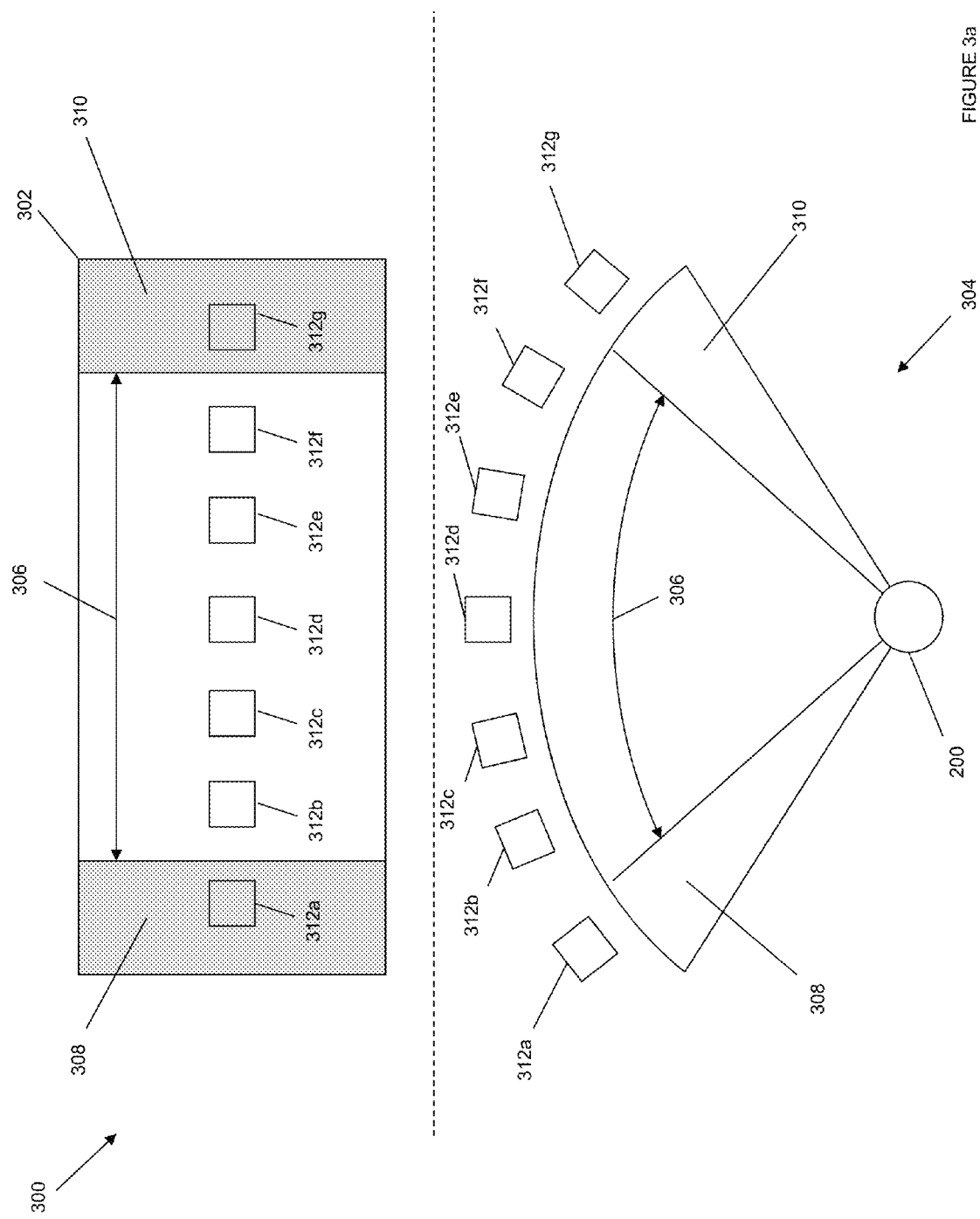
FIG. 3a is a schematic view illustrating an embodiment of the display of graphical information according to a first user field of view.

The method 100 may then proceed to block 106 where information is displayed according to a user field of view. As discussed in further detail below, the user field of view at block 106 may be the user field of view that is based on the range of head motion of the user 200 as illustrated in FIG. 2m, a user field of view that is included in images captured by a camera on the wearable user device 202, and/or combinations thereof. Referring now to FIG. 3a, a schematic view 300 of the display of graphical information according to a first user field of view is illustrated. In an embodiment, the schematic view 300 illustrates the display of information to a user with the restricted field of view 216, discussed above with reference to FIG. 2m. The schematic view 300 includes a screen shot 302 that provides a "first-person" view of the screen displayed on the display device 202a to a user 200 with the restricted field of view 216, as well as a top view 304 that schematically illustrates how information is perceived by that user 200. The screenshot 302 and top view 204 illustrate how the user 200 has a stationary head viewing range 306 (i.e., a viewing range provided without the user 200 moving their head) that may be extended into extended range 308 and extended range 310 by the user yawing their head left and right. The limits of the extended ranges 308 and 310 are determined according to the calibration information and field of view calibration discussed above.

In an embodiment, at block 106, the display engine displays a plurality of icon graphical elements 312a, 312b, 312c, 312d, 312e, 312f, and 312g according to the user field of view that includes the stationary head viewing range 306 and the extended ranges 308 and 310. The restricted range of head motion 216, which provide the stationary head viewing range 306 and the extended ranges 308 and 310 illustrated in FIG. 3a, is used by the display engine to determine an icon detail that, in the illustrated embodiment, is a size of the icons graphical elements 312a-g. At block 106, the display engine displays the icon graphical elements 312a-g at a first size such that the icon graphical elements 312b-f are viewable in the stationary head viewing range 306, the icon graphical element 312a is viewable in the extended range 308, and the icon graphical element 312g is viewable in the extended range 310.

Figure 3B:
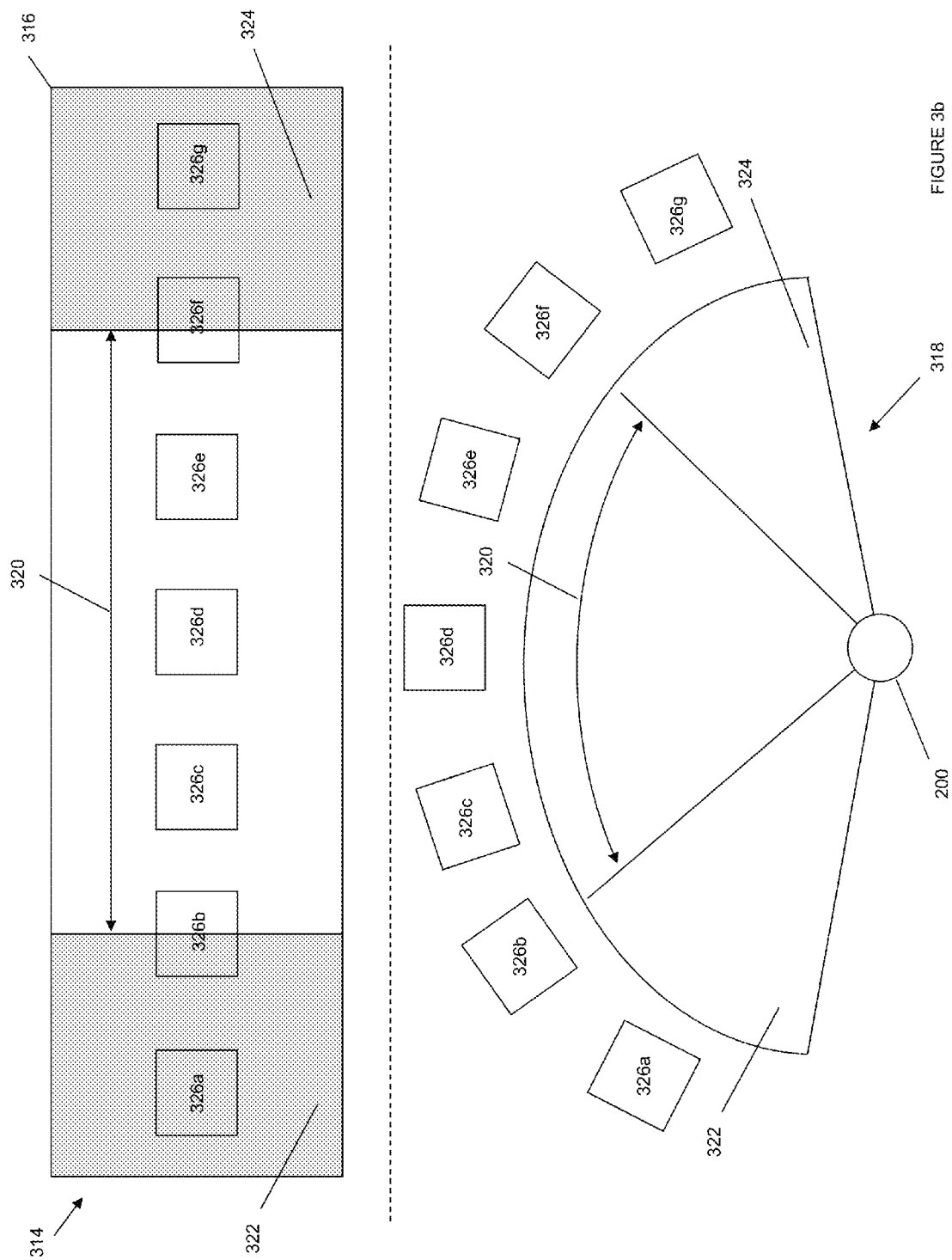
FIG. 3b is a schematic view illustrating an embodiment of the display of graphical information according to a second user field of view.

Referring now to FIG. 3b, a schematic view 314 of the display of graphical information according to a second user field of view is illustrated. In an embodiment, the schematic view 314 illustrates the display of information to a user with the normal field of view 214, discussed above with reference to FIG. 2m. The schematic view 300 includes a screen shot 316 that provides a "first-person" view of the screen displayed on the display device 202a to a user 200 with the normal field of view 214, as well as a top view 318 that schematically illustrates how information is perceived by that user 200. The screenshot 316 and top view 318 illustrate how the user 200 has a stationary head viewing range 320 (i.e., a viewing range provided without the user moving their head) that may be extended into extended range 322 and extended range 324 by the user yawing their head left and right. The limits of the extended ranges 322 and 324 are determined according to the calibration information and the field of view calibration discussed above.

In an embodiment, at block 106, the display engine displays a plurality of icon graphical elements 326a, 326b, 326c, 326d, 326e, 326f, and 326g according to the user field of view that includes the stationary head viewing range 320 and the extended ranges 322 and 324. The normal range of head motion 214, which provides the stationary head viewing range 320 and the extended ranges 322 and 324 illustrated in FIG. 3b, may be used by the display engine to determine an icon detail that, in the illustrated embodiment, is a size of the icons graphical elements 326a-g. At block 106, the display engine displays the icon graphical elements 326a-g at a second size such that a portion of the icon graphical elements 326a and 326f, as well as the icon graphical elements 326c-e, are viewable in the stationary head viewing range 320, the icon graphical element 312a and a portion of the icon graphical element 326b are viewable in the extended range 322, and the icon graphical element 312g and a portion of the icon graphical element 326f are viewable in the extended range 324.

Thus, depending on the user field of view as determined by the field of view calibration based on the range of head movement of the user 200, icon graphical elements may be displayed at different sizes. For example, the embodiments illustrated in FIGS. 3a and 3b illustrate how the display engine may display the same number of icon graphical elements, but may change their size depending on the user range of head motion/to the calibration information and field of view. While changing icon size based on the user field of view has been illustrated and described above, one of skill in the art in possession of the present disclosure will recognize that a wide variety of icon details may be changed based on the user range of head motion/field of view while falling within the scope of the present disclosure. Furthermore, while only head yaw range of motion has been illustrated and described as being used to determine how to display information at block 106, one of skill in the art in possession of the present disclosure will appreciate that information may be adjusted for display by the display engine based on the head pitch range of motion and the head roll range of motion as well.

Figure 4B:
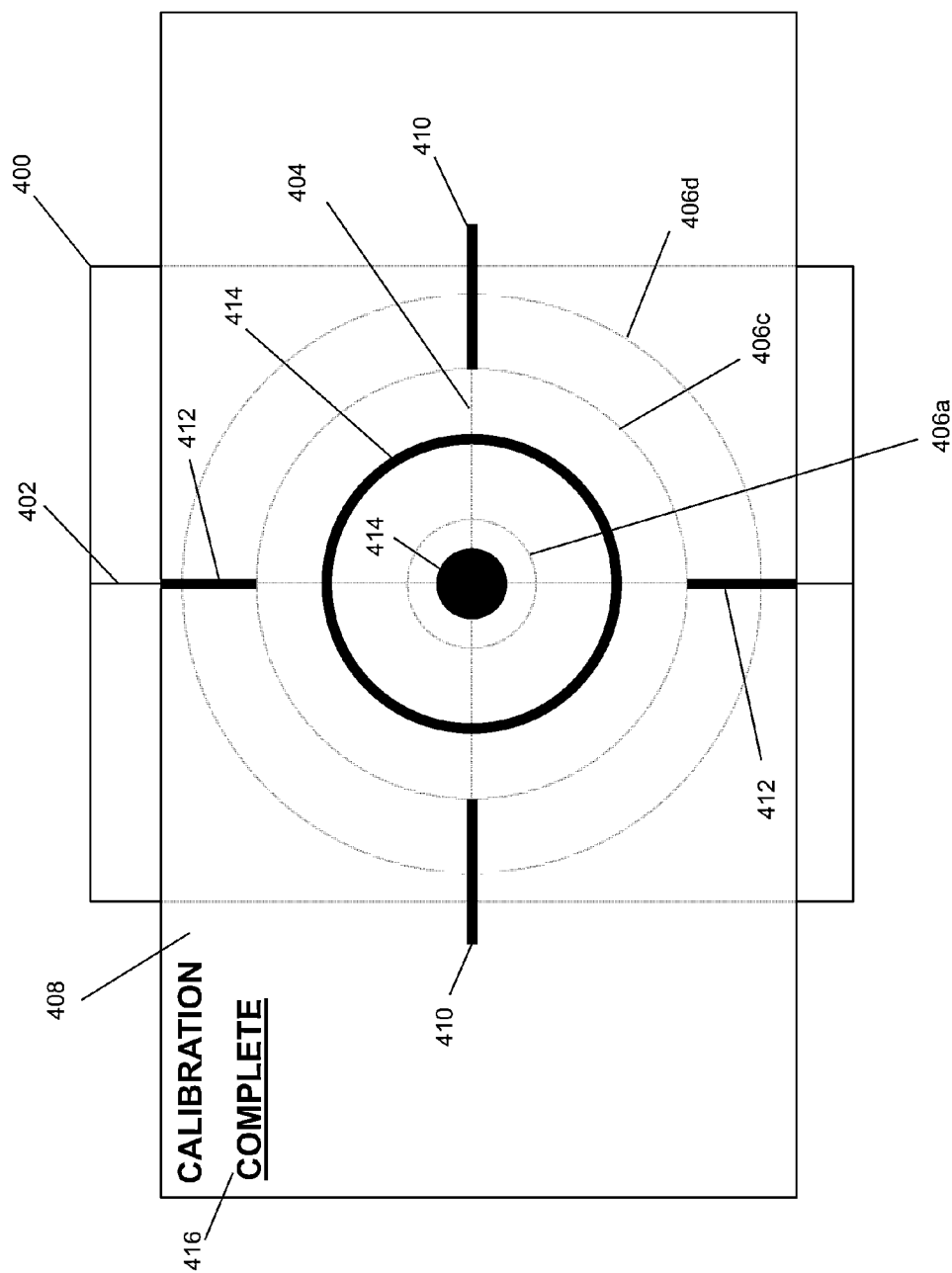

Referring next to FIGS. 4a and 4b, embodiments for determining calibration information at block 102 of the method 100 are illustrated. In the embodiments illustrated in FIGS. 4a and 4b, a primary calibration object is used to determine calibration information and, as discussed in further detail below, may then be utilized for adjusting the display of graphical information to the user based on secondary calibration objects in the user's field of view. Referring initially to FIG. 2a, the user 200 may wear the wearable user device 202 that includes the display device 202a that is positioned in front of a user's eye. As discussed in further detail below, the wearable user device 202 includes a non-transitory memory that includes instructions that, when executed by one or more hardware processors in the wearable user device 202, cause the one or more hardware processors to provide a display engine that performs the functions of the wearable user device 202 discussed herein.

At block 102, the user 200 may approach a primary calibration object 400 that, in the illustrated embodiment, is positioned on the wall 206 and includes a horizontal line 402, a vertical line 404, and a plurality of circular calibration target elements 406a, 406b, 406c, and 406d. In response to recognizing the primary calibration object 400 (e.g., using image recognition techniques), an instruction received from the user 200, or to a variety of other calibration initiation instructions known in the art, the display engine in the wearable user device 202 may provide a calibration screen 408, illustrated in FIG. 4a, on the display device 202a. In the illustrated embodiment, the calibration screen 408 includes a calibration instruction 408a that instructs the user to stand a distance from the primary calibration object 400 and center the primary calibration object 400 in their view.

In an embodiment of block 102, the user 200 performs a user action by standing at the distance 210 from the wall 206 and/or primary calibration object 400 (e.g., a distance marked by a line on the floor in the illustrated embodiment) and views the primary calibration object 400 such that the intersection of the horizontal line 402 and the vertical line 404 that are within the circular target element 406a is at the center of the user's field of view. The camera on the wearable user device 202 captures images of the primary calibration object 400 and provides to images to the display engine for use in determining whether the primary calibration object is centered in the user's view (e.g., based on the intersection of the horizontal line 402 and the vertical line 404 that are within the circular target element 406a being at the center of the calibration screen 408).

Referring now to FIG. 4b, in response to determining that the primary calibration object 400 is centered in the user's view, the display engine may display centering graphics on the display device 202a including horizontal centering lines 410, vertical centering lines 412, and circular centering indicators 414, along with a calibration complete indicator 416, which operate to indicate to the user 200 that they have properly centered the primary calibration object 400 in their view. Furthermore, the display engine may save calibration information that includes a known size of primary calibration object 400 and its features (e.g., the horizontal line 402, vertical line 404, and plurality of circular target elements 406a, 406b, 406c, and 406d), the known distance 210 between the user and the primary calibration object 400, and information from the images captured of the centered primary calibration object 400 (e.g., the perceived sizes of the different features of the primary calibration object 400 (e.g., the horizontal line 402, vertical line 404, and plurality of circular target elements 406a, 406b, 406c, and 406d)).

The method 100 then proceeds to block 104 where a field of view calibration is performed using the calibration information determined at block 102. Using the calibration information determined according to the embodiment illustrated in FIGS. 4a and 4b, a field of view calibration may be performed on the display engine that programs the display engine with information about the size of the primary calibration object 400 and its perceived size when viewed by the user 200 through the wearable user device 202. As discussed below, being programmed with the calibration information determined as discussed above with reference to FIGS. 4a and 4b allows the display engine to provide perspective enhanced graphical information based on secondary calibration objects that are located in the user's field of view.

Figure 5:
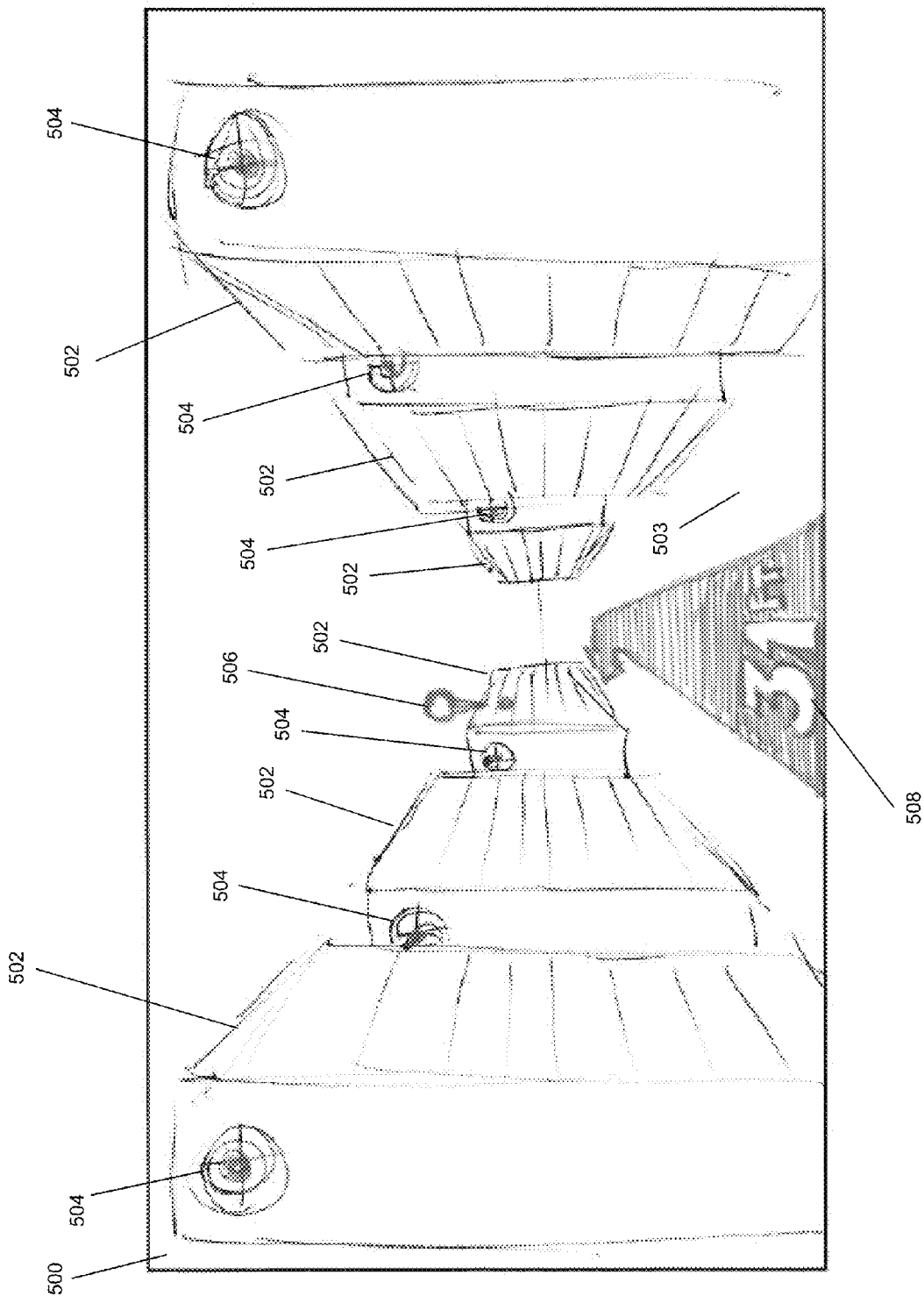
FIG. 5 is a screen shot view illustrating an embodiment of the display of graphical information according to a user field of view.

Referring now to FIG. 5, an embodiment of a perspective enhanced graphical information screen 500 is illustrated that includes perspective enhanced graphical information that may be displayed according to a user's field of view at block 106 of the method 100. In the embodiment illustrated in FIG. 5, the perspective enhanced graphical information screen 500 is provided on the display device 202a such that it is viewed by the user 200 over physical objects in the user's field of view. For example, a plurality of physical objects 502 (e.g., shelving units in the illustrated embodiment) on a floor 503 are located opposite the display device 202a from the user's eye, with a plurality of secondary calibration objects 504 positioned in view of a camera on the wearable user device 202 (e.g., on the sides of the physical objects 502 in the illustrated embodiment). In an embodiment, each of the secondary calibration objects 504 may be substantially similar to the primary calibration object 400 discussed above, including the same dimensions and the same sized features (e.g., the same size horizontal lines, vertical lines, and circular target elements).

In the embodiment illustrated in FIG. 5, user 200 may have provided an instruction to the wearable user device 202 to find a product that is located in one of the shelving unit physical objects 502. The wearable user device 202 may then operate to determine the location of the requested product (e.g., by referencing a database of product locations, communicating with the requested product using wireless communication techniques, etc.). Furthermore, the camera on the wearable user device 202 may capture images of the field of view of the user 200 that includes the physical objects 502, floor 504, and secondary calibration objects 504. In one example, the wearable user device 202 may use the determined location of the product, the image of the user's field of view received from the camera, a determined location of the user (e.g., received from a location determination device in the wearable user device), and/or other information known in the art to determine a location of the product in the user's field of view and display a product indicator 506 on the perspective enhanced graphical information screen 500 that indicates the location of the product in the field of view of the user 200, as well as a product direction graphical information 508 that provides the user 200 with directions to the product along with a distance to the product (e.g., 31 feet in the illustrated embodiment).

In the example illustrated in FIG. 5, the product indicator 506 and the product direction graphical information 508 are perspective enhanced graphical information that is provided by the display engine using the secondary calibration objects 504 included in one or more images taken of the field of view of the user 200. The display engine uses the sizes of the secondary calibration objects 504 in the image of the field of view of the user, along with the calibration information determined based on the calibration using the primary calibration object 400 discussed above, to calculate how far away those secondary calibration objects 504 are from the user 200. That calculation allows the display engine to display the perspective enhanced graphical information such as the product identifier 506, which may be displayed as larger as the user physically approaches the product being indicated, and the product direction graphical information 508, which is displayed such that it appears to be located on the floor 504 and extending a distance away from the user 200. As the user 200 moves towards the product identified by the product indicator 506, the display engine may continuously receive images from the camera on the wearable user device 202 and use those images (each of which may include the secondary calibration objects 506) to modify the display of the product indicator 506 and the product direction graphical information 508 such that product indicator 506 is enlarged and the product direction graphical information 508 does not appear to the user to change dimensions relative to the physical objects 502 and floor 504 in the field of view of the user 200. The display engine may also continuously calculate the distance of the user 200 from the product indicated by the product indicator 506 to update the distance between the user and the product that is displayed on the product direction graphical information 508.

Figure 6:
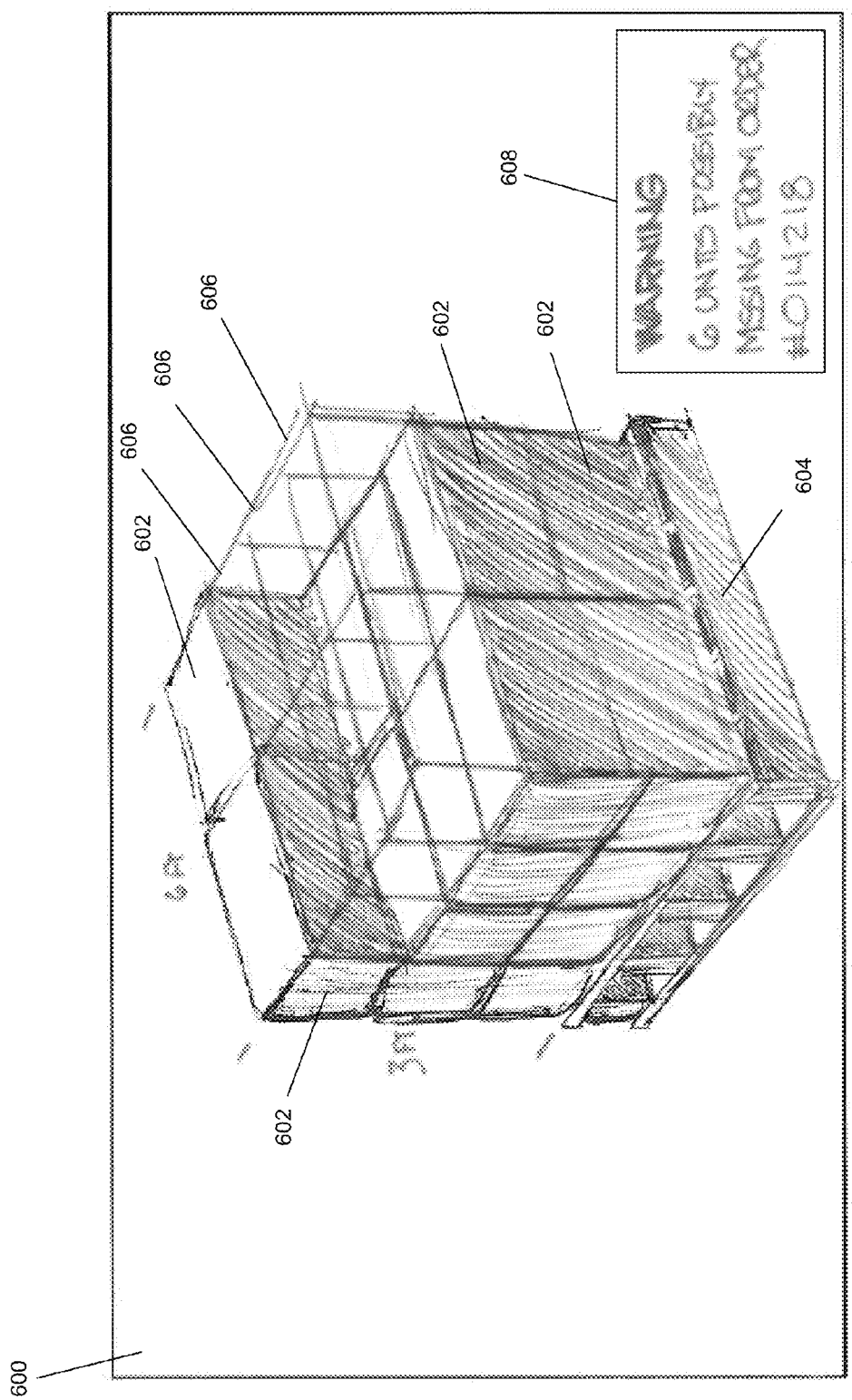
FIG. 6 is a screen shot view illustrating an embodiment of the display of graphical information according to a user field of view.

Referring now to FIG. 6, an embodiment of a perspective enhanced graphical information screen 600 is illustrated that includes perspective enhanced graphical information that may be displayed according to a user's field of view at block 106 of the method 100. In the embodiment illustrated in FIG. 6, the perspective enhanced graphical information screen 600 is provided on the display device 202*a* such that it is viewed by the user 200 over physical objects in the user's field of view. For example, a plurality of physical objects 602 (e.g., product boxes in the illustrated embodiment) on a pallet 604 are located opposite the display device 202*a* from the user's eye. In an embodiment, secondary calibration objects (not illustrated, but similar to the secondary calibration objects 504 discussed above with reference to FIG. 5) may be positioned on or near the physical objects 602 such that those secondary calibration objects are in view of a camera on the wearable user device 202. In an embodiment, each of the secondary calibration objects may be substantially similar to the primary calibration object 400 discussed above, including the same dimensions and the same sized features (e.g., the same size horizontal lines, vertical lines, and circular target elements).

In the embodiment illustrated in FIG. 6, user 200 is viewing the plurality of product box physical objects 602 positioned on the pallet 604. The wearable user device 202 may operate to automatically determine whether the product box physical objects 602 on the pallet 604 correspond to details about an expected number of product box physical objects in a database in response to the product box physical objects 602 being in the field of view of the user 200, in response to an instruction from the user 200 (e.g., an instruction by the user 200 to "check product order"), etc. For example, the camera on the wearable user device 202 may capture images of the field of view of the user 200 that includes the physical objects 602, the pallet 604, and the secondary calibration object(s). In one example, the wearable user device 202 may use the information about the product box physical objects 602 in the database, the image of the user's field of view received from the camera, and/or other information known in the art to determine a number of product box physical objects 602 on the pallet 604, determine whether that number of product box physical objects 602 matches the expected number of product box physical objects in the database, and (in the illustrated embodiment) provide product box graphical indicators 606 if the number of product box physical objects 602 does not match the expected number of product box physical objects in the database.

In the example illustrated in FIG. 6, the product box graphical indicators 606 are perspective enhanced graphical information that are provided by the display engine using the secondary calibration objects included in one or more images taken of the field of view of the user 200. The display engine uses the sizes of the secondary calibration objects in the image of the field of view of the user, along with the calibration information determined based on the calibration using the primary calibration object 400 discussed above, the sizes of the product box physical objects 602 in the field of view of the user 200, and the expected number of product box physical objects 602 in the database to display the product box graphical indicators 606 in a manner that indicates to the user 200 that product box physical objects may be missing from an order (e.g., as "wire-frame" representations of the product box physical objects that should be located on the pallet 604 according to the expected number of product box physical objects in the database). As illustrated, the display engine may display the perspective enhanced graphical information such as the product box graphical indicators 606 so that they appear stacked upon the product box physical objects 602 and each other, which provides the user with perspective enhanced graphics that allow the user to quickly recognize that product box physical objects are missing from an order. As the user 200 moves towards or around the product box physical objects 602, the display engine may continuously receive images from the camera on the wearable user device 202 and use those images (which include the secondary calibration objects) to modify the display of the product box graphical indicators 606 such that product box graphical indicators 606 are enlarged, rotated, and/or otherwise reoriented to "stationary" in their perceived positioning on the product box physical objects 602 located in the field of view of the user 200. The display engine may also display a warning 608 on the display device 202*a* that includes an order number, along with a number of product box physical objects that the display engine determined were missing from that order.

Figure 7:
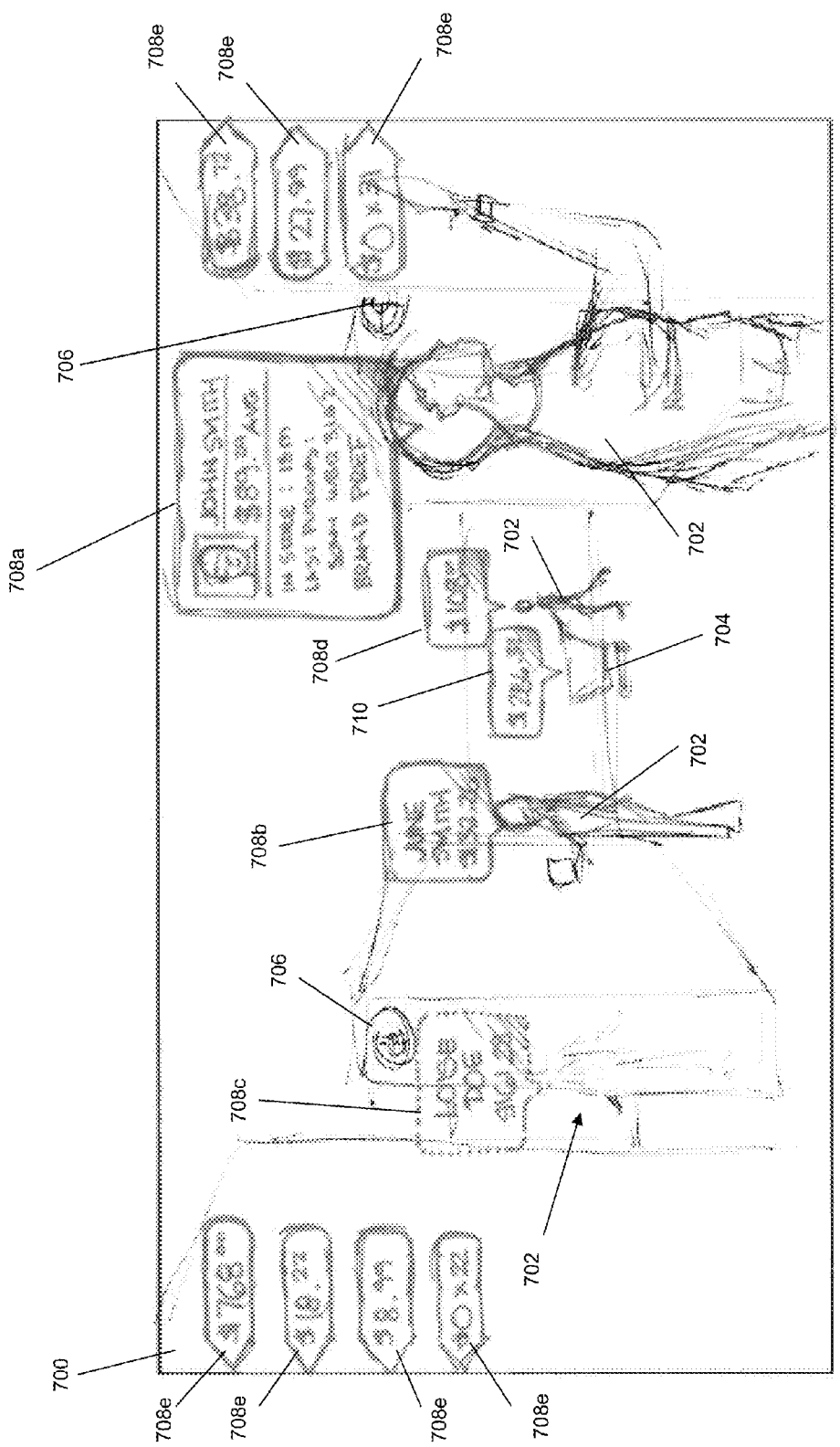
FIG. 7 is a screen shot view illustrating an embodiment of the display of graphical information according to a user field of view.

Referring now to FIG. 7, an embodiment of a perspective enhanced graphical information screen 700 is illustrated that includes perspective enhanced graphical information that may be displayed according to a user's field of view at block 106 of the method 100. In the embodiment illustrated in FIG. 7, the perspective enhanced graphical information screen 700 is provided on the display device 202*a* such that it is viewed by the user 200 over physical objects in the user's field of view. For example, a plurality of physical objects 702 and 704 (e.g., customers and a shopping cart in the illustrated embodiment) in a store are located opposite the display device 202*a* from the user's eye. In an embodiment, shelving units in the store include secondary calibration objects 706 that are in view of a camera on the wearable user device 202. In an embodiment, each of the secondary calibration objects 706 may be substantially similar to the primary calibration object 400 discussed above, including the same dimensions and the same sized features (e.g., the same size horizontal lines, vertical lines, and circular target elements).

In the embodiment illustrated in FIG. 7, the user 200 is viewing the plurality of customer physical objects 602 and shopping cart physical objects 704 positioned in the store. The wearable user device 202 may operate to recognize customers (e.g., using facial recognition techniques, through communication with customer devices such as mobile phones, and/or using a variety of other techniques known in the art) and, in response, retrieve information (e.g., from a database in a merchant device) about those customers including customer names, customer average spending habits, customer purchase histories, and/or a variety of other customer information known in the art. The wearable user device 202 may also operate to communicate with the shopping cart physical objects 704 and, in response, retrieve information about the products a customer has placed in those shopping cart physical objects 704 (e.g., product identifications, product prices, cumulative price of a plurality of products, etc.). Furthermore, the camera on the wearable user device 202 may capture images of the field of view of the user 200 that includes the customer physical objects 702, the shopping cart physical objects 704, and the secondary calibration objects 706. In one example, the wearable user device 202 may use the information retrieved from customer physical objects 702, shopping cart physical objects 704, images of the user's field of view received from the camera, and/or other information known in the art to generate customer information windows 708a, 708b, 708c, 708d, and 708e, along with shopping cart information window 710.

In the example illustrated in FIG. 7, the customer information windows 708a-e and the shopping cart information window 710 are perspective enhanced graphical information that are provided by the display engine using the secondary calibration objects 706 included in one or more images taken of the field of view of the user 200. The display engine uses the sizes of the secondary calibration objects 706 in the image of the field of view of the user, along with the calibration information determined based on the calibration using the primary calibration object 400 discussed above, and the retrieved customer and shopping cart information to display the customer information windows 708a-e and the shopping cart information window 710 in a variety of manners that may depend on the distance of customers and shopping carts from the user 200. As illustrated, the display engine may display the perspective enhanced graphical information as the customer information windows 708a-e and the shopping cart information window 710 such that more information is displayed for a customer or shopping cart when that customer or shopping cart is close to the user. As the user 200 moves relative to customer physical objects 702 and/or shopping physical objects 704, the display engine may continuously receive images from the camera on the wearable user device 202 and use those images (which include the secondary calibration objects 706) to modify the display of the customer physical objects 702 and/or shopping physical objects 704 such that customer physical objects 702 and/or shopping physical objects 704 are enlarged, shrunk, include more information, include less information, etc.

In the specific example illustrated in FIG. 7, the customer information window 708a is displayed for a customer that is closest to the user 200, and thus that customer information window 708a is larger than the other customer information windows 708b-e and includes information such as a customer name, an average amount spent by the customer in a typical shopping trip, a time that the customer has spent in the store, a previous purchase of the customer, a brand preference of the customer, and/or a variety of other customer information known in the art. The customer information windows 708b and 708c are displayed for customers that are an intermediate distance from the user 200 (including a customer that is partially obscured by a shelving unit), and includes information such as a customer name and average amount spent by the customer in a typical shopping trip. Thus, as can be seen, the customer information windows 708b and 708c are smaller than the customer information window 708a based on the display engine determining that the customer for the customer information window 708a is closer to the user 200 than the customers for the customer information windows 708b and 708c.

Similarly, the customer information window 708d is displayed for a customer that is the furthest distance from the user 200, and includes information about the average amount spent by the customer in a typical shopping trip. Thus, as can be seen, the customer information window 708d is smaller than the customer information windows 708a, 708b, and 708c based on the display engine determining that the customer for the customer information window 708d is further from the user 200 than the customers for the customer information windows 708a, 708b, and 708c. The customer information windows 708e are for customers that have been detected but are outside the user's field of view, and include information about the average amount spent by those customers in a typical shopping trip. As can be seen, the display engine may have been primary calibration object 400 unable to retrieve data for several customers outside of the users view, or those customers may be new customers, and thus no customer information is available for those customers (e.g., the 22 customers to the left of the user 200 that have an average spending amount of $0, and the 31 customers to the right of the user 200 that have an average spending amount of $0). The shopping cart information window 710 is displayed for a shopping cart that is the relative far from the user 200, and includes information about the cumulative amount of products currently in the shopping cart.

Referring now to FIG. 8, an embodiment of a perspective enhanced graphical information screens 800a, 800b, and 800c are illustrated that includes perspective enhanced graphical information that may be displayed according to a user's field of view at block 106 of the method 100 at different times as a physical object becomes close to the user 200. In an embodiment, the perspective enhanced graphical information screens 800a, 800b, and 800c of FIG. 8 may be displayed as a customer 702 and shopping cart 704 approach the user 200 in the store in FIG. 7. In the embodiment illustrated in FIG. 8, the perspective enhanced graphical information screens 800a, 800b, and 800c are provided at different times (e.g., the perspective enhanced graphical information screen 800a, followed by the perspective enhanced graphical information screen 800b, followed by the perspective enhanced graphical information screen 800c) on the display device 202a such that it is viewed by the user 200 over physical objects in the user's field of view. For example, a plurality of physical objects 802 and 804 (e.g., a customer and a shopping cart in the illustrated embodiment) in a store are located opposite the display device 202a from the user's eye. In an embodiment, secondary calibration objects (e.g., similar to the secondary calibration objects 706 in FIG. 7) are in view of a camera on the wearable user device 202. In an embodiment, each of the secondary calibration objects may be substantially similar to the primary calibration object 400 discussed above, including the same dimensions and the same sized features (e.g., the same size horizontal lines, vertical lines, and circular target elements).

In the embodiment illustrated in FIG. 8, user 200 is viewing the customer physical object 802 and shopping cart physical object 804 as the customer approaches the user 200 with the shopping cart 804. As discussed with reference to FIG. 7, the wearable user device 202 may operate to recognize customers and, in response, retrieve information about those customers, as well as communicate with shopping carts to retrieve information about the products a customer has placed in those shopping cart physical objects 704. The camera on the wearable user device 202 may capture images of the field of view of the user 200 that includes the customer physical object 802, the shopping cart physical object 804, and the secondary calibration objects. In one example, the wearable user device 202 may use the information retrieved from customer physical object 802, the shopping cart physical object 804, images of the user's field of view received from the camera, and/or other information known in the art to generate customer information window 806 and shopping cart information window 808.

However, as can be seen from the graphical information screens 800a, 800b, and 800c in FIG. 8, as the customer physical object 802 and the shopping cart physical object 804 move closer to the user 200, the display engine uses the images of the user's field of view received from the camera to determine their relative distance from the user 200 and operates to enlarge the customer information window 806 and shopping cart information window 808 and, in the illustrated embodiment, provide more information about the customer in the customer information window 806 and more information about the shopping cart contents in the shopping cart information window 808. For example, the graphical information screen 800a illustrates the customer information window 806 and shopping cart information window 808 when the customer physical object 802 and shopping cart physical object 804 are furthest away from the user 200, with the customer information window 806 displaying an average amount the customer typically spends at the store, and the shopping cart information window 808 displaying a cumulative amount of the products currently in the shopping cart.

The graphical information screen 800b illustrates the customer information window 806 and shopping cart information window 808 when the customer physical object 802 and shopping cart physical object 804 have moved closer to the user 200 relative to the graphical information screen 800a, with the customer information window 806 displaying a customer name and an average amount the customer typically spends at the store, and the shopping cart information window 808 displaying a cumulative amount of the products currently in the shopping cart as well as product descriptions for products in the shopping cart. The graphical information screen 800c illustrates the customer information window 806 and shopping cart information window 808 when the customer physical object 802 and shopping cart physical object 804 have moved closer to the user 200 relative to the graphical information screen 800b, with the customer information window 806 displaying a customer name, an average amount the customer typically spends at the store, a time the customer has spent in the store, a previous purchase of the customer, and a brand preference of the customer, and the shopping cart information window 808 displaying a product descriptions for products in the shopping cart and a price of each of those products. Thus, the display engine may provide perspective enhanced graphics than change based on the user's field of view and, in particular, based on perspective details of physical objects in the user's field of view.

While the examples of the provision of perspective enhanced graphical information above rely on specific secondary calibration objects positioned in the user field of view that are related to the primary calibration object detailed in FIGS. 4a and 4b, other methods of calibration to provide perspective enhanced graphical information is envisioned as falling within the scope of the present disclosure. In one embodiment, the wearable user device 202 may be able to retrieve dimensions for a variety of physical objects in the user's field of view, and use those dimensions along with images of the user's field of view to provide perspective enhanced graphical information. For example, the wearable user device 202 may be able to retrieve known dimensions for a stop sign, and thus a stop sign in a user's field of view may be utilized as the secondary calibration objects discussed above to provide perspective enhanced graphical information. Similarly, the wearable user device 202 may be able to retrieve known dimensions for products, and thus products in a user's field of view may be utilized as the secondary calibration objects discussed above to provide perspective enhanced graphical information. As such, in some situations, the wearable user device 202 may be pre-calibrated, and the calibration discussed above with reference to FIGS. 4a and 4b may be skipped.

Furthermore, in addition to the calibration and image information discussed above, other external data sources may be utilized to enhance the display features of the wearable user device. For example, map data, customer data, product data, and/or a variety of other external data available to the wearable user device (e.g., over the network) may be retrieved and displayed along with, or in conjunction with, the enhanced graphical information.

Figure 9A:
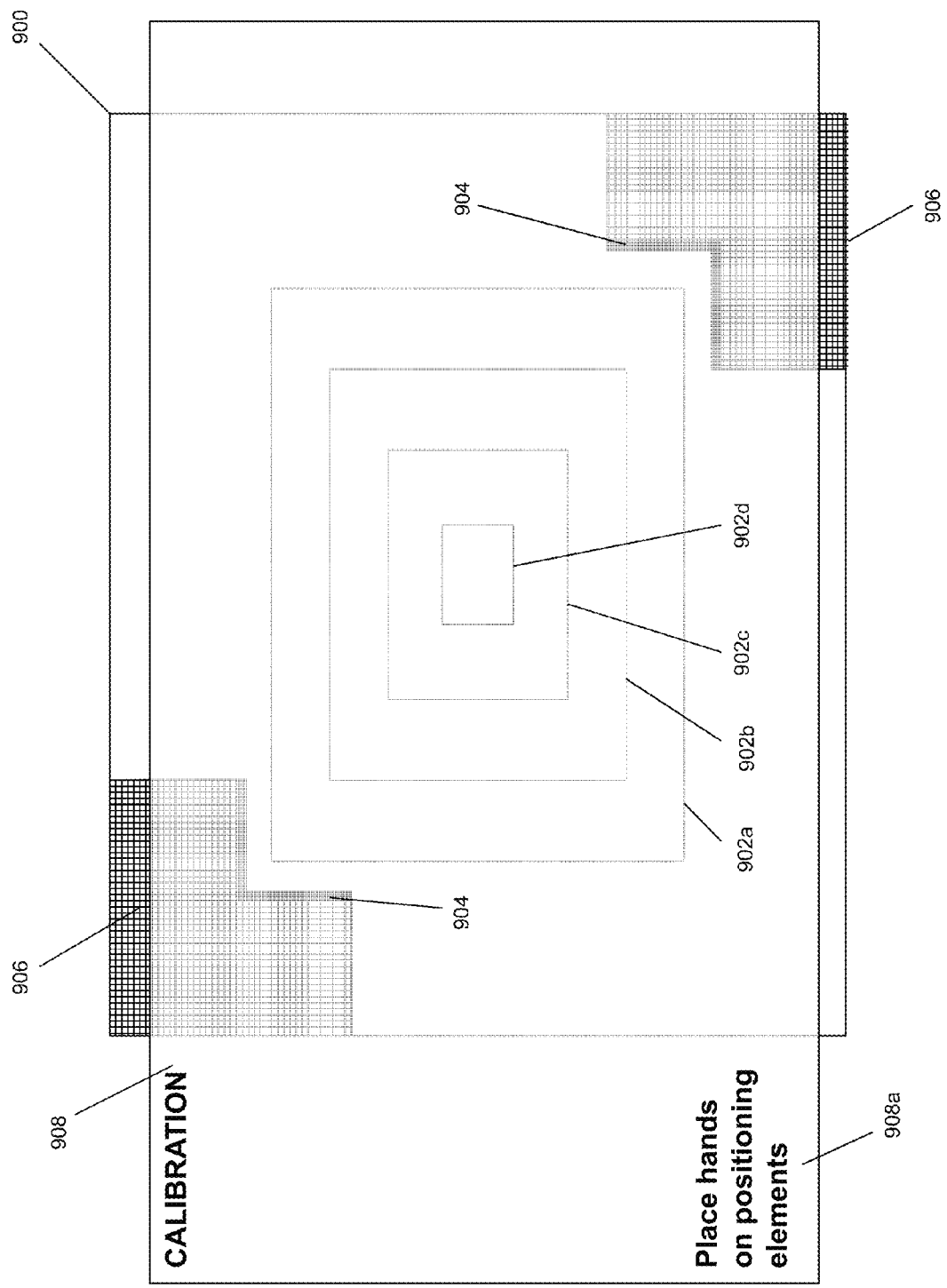
FIG. 9a is a screen shot illustrating an embodiment of a calibration request screen.
Figure 9B:
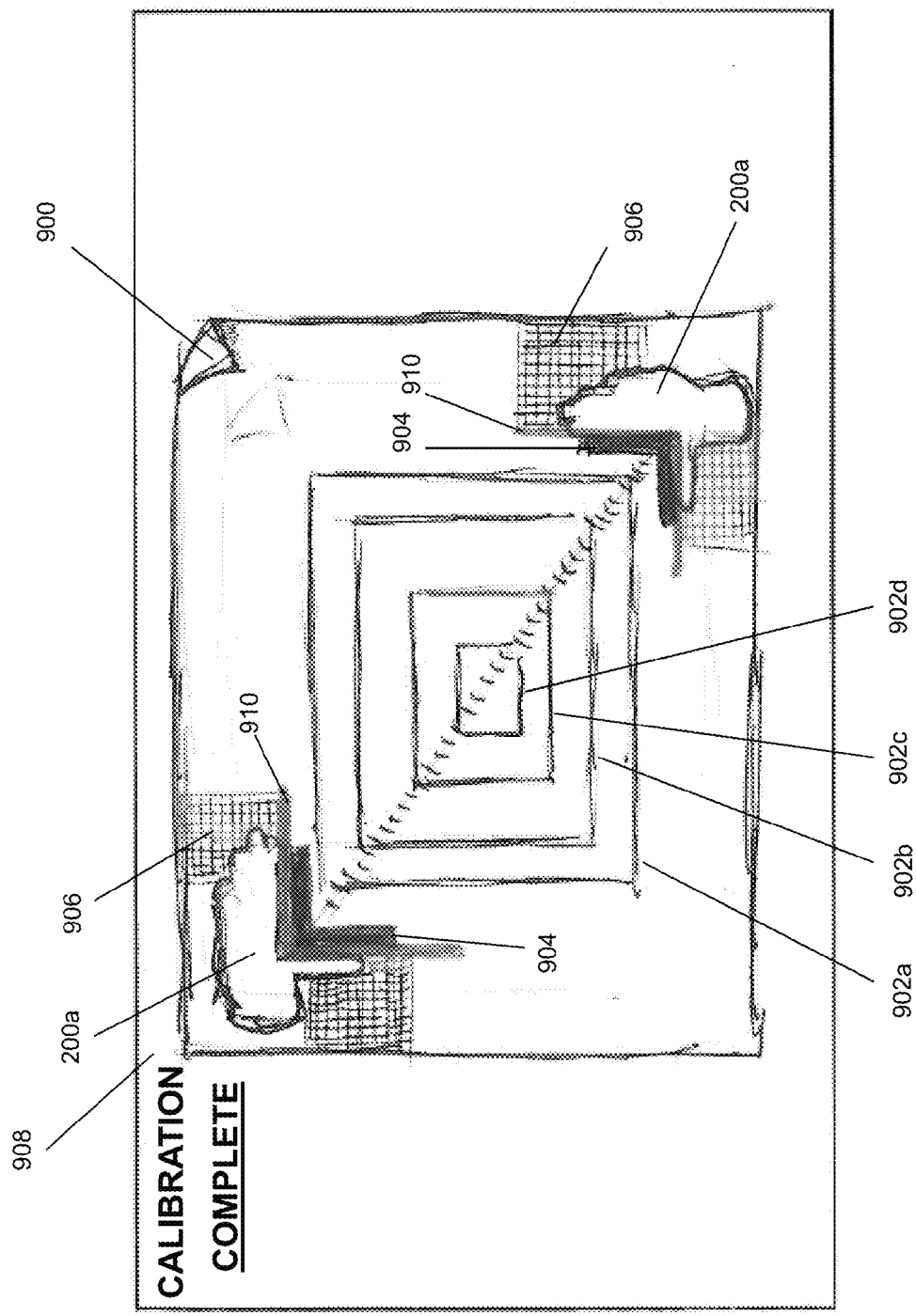
FIG. 9b is a screen shot illustrating an embodiment of a user performing a user action to provide calibration information.
Figure 9C:
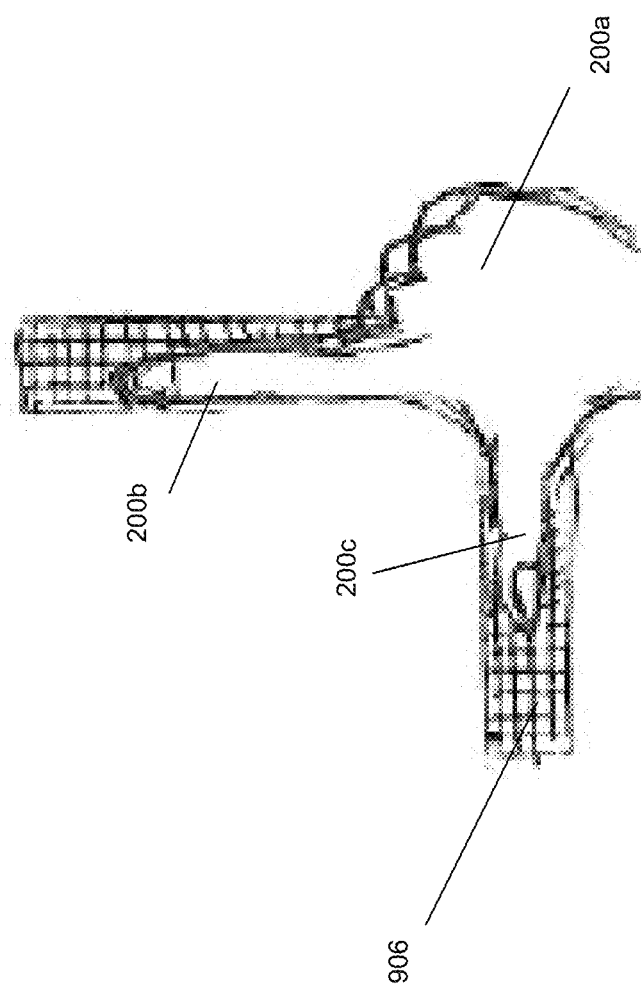
FIG. 9c is a screen shot illustrating an embodiment of a user performing a user action to provide calibration information.

Referring next to FIGS. 9a, 9b, and 9c, embodiments for determining calibration information at block 102 of the method 100 are illustrated. In the embodiments illustrated in FIGS. 9a-c, a calibration object is used, along with the hands of the user 200, to determine calibration information and, as discussed in further detail below, may then be utilized making measurements using the user's hands when the user's hands are in the user's field of view. Referring initially to FIG. 2a, the user 200 is wearing the wearable user device 202 that includes the display device 202a that is positioned in front of the user's eye. As discussed in further detail below, the wearable user device 202 includes a non-transitory memory that includes instruction that, when executed by one or more hardware processors in the wearable user device, cause the one or more hardware processors to provide a display engine that performs the functions of the wearable user device discussed herein.

At block 102, the user 200 may approach a calibration object 900 that, in the illustrated embodiment, is positioned on the wall 206 and includes a plurality of rectangular measurement elements 902a, 902b, 902c, and 902d, hand positioning elements 904, and hand measurement grids 906. In response to recognizing the calibration object 900 (e.g., using image recognition techniques), an instruction received from the user 200, or to a variety of other calibration initiation instructions known in the art, the display engine in the wearable user device 202 may provide a calibration screen 908, illustrated in FIG. 9a, on the display device 202a. In the illustrated embodiment, the calibration screen 908 includes a calibration instruction 908a that instructs the user to place their hands on the positioning elements 904 of the calibration object 900.

In an embodiment of block 102, the user 200 performs a user action by placing their hands 200a on the positioning elements 904 of the calibration object 900 and views the calibration object 900 such that the user's hands 200a are in the user's field of view, as illustrated in FIG. 9b. The camera on the wearable user device 202 captures images of the calibration object 900 and the users hands 200a and provides those images to the display engine for use in determining calibration information such as the size of the user's hands 200a and the perceived distance between the user's hands 200a on the calibration object 900. In response to determining that the user's hands are properly positioned on the calibration object 900, the display engine may display calibration graphics 910 on the display device 202a adjacent each of the user's hands 200a, which operate to indicate to the user 200 that they have properly positioned their hands 200a on the calibration object 900. Furthermore, the display engine may save calibration information that includes a known size of the calibration object 900 and its features (e.g., the plurality of rectangular measurement elements 902a-d), the known distance 210 between the positioning elements 910 on the calibration object 900, and information from the images captured of the user's hands 200a on the calibration object 900.

Referring now to FIG. 9c, an embodiment of a user's hand 200a positioned on the hand measurement grid 906 on the calibration object 900 is illustrated. As can be seen, the user's hand 200a includes a finger 200b and a thumb 200c that are positioned over the hand measurement grid 906. The measurement grid 906 may include grid cells of known sizes (e.g., square inches, square centimeters, etc.) that allow the finger 200b and thumb 200c of the user 200 to be measured accurately, including measurements of length and width of the finger 200b and thumb 200c that may be saved as calibration information.

The method 100 then proceeds to block 104 where a field of view calibration is performed using the calibration information determined at block 102. Using the calibration information determined according to the embodiment illustrated in FIGS. 9a, 9b, and 9c, a field of view calibration may be performed on the display engine that programs the display engine with information about the size of the size of the user's hands 200a, finger 200b, thumb 200c, and the distance between the hands 200a positioned on the positioning elements 904 on the calibration object 900 as perceived by the user 200. As discussed below, being programmed with the calibration information determined as discussed above with reference to FIGS. 9a, 9b, and 9c allows the display engine to determine measurement distances between the user's hands and display measurement graphical information related to that measurement distance.

Figure 10A:
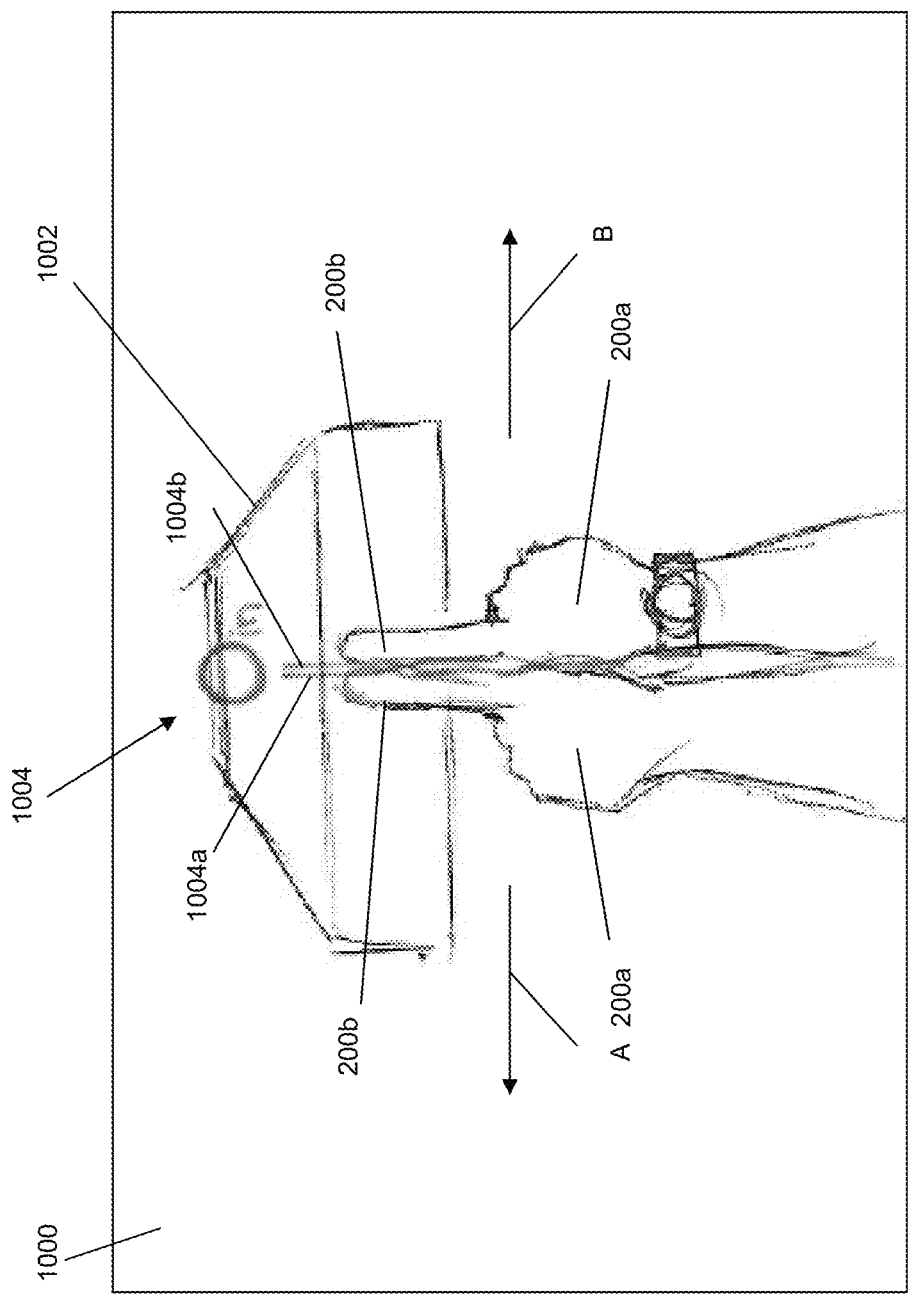
FIG. 10a is a screen shot view illustrating an embodiment of the display of graphical information according to a user field of view.

Referring now to FIG. 10a, an embodiment of a measurement graphical information screen 1000 is illustrated that includes measurement graphical information that may be displayed according to a user's field of view at block 106 of the method 100. In the embodiment illustrated in FIG. 10a, the measurement graphical information screen 1000 is provided on the display device 202a such that it is viewed by the user 200 over physical objects in the user's field of view. For example, a physical object 1002 (e.g., a product box in the illustrated embodiment) is located opposite the display device 202a from the user's eye, along with the user's hands 200a with a finger 200b on each hand 200a extended.

In the embodiment illustrated in FIG. 10a, the user 200 may wish to measure one or more dimensions of the physical object 1002, and may provide an instruction to the wearable user device 202 to begin measurement by speaking such an instruction, positioning their hands 200a as illustrated in FIG. 10a, and/or in a variety of other manners. Furthermore, the camera on the wearable user device 202 may capture images of the field of view of the user 200 that includes the physical object 1002 and user hands 200a with fingers 200b extended. In one example, the wearable user device 202 may recognize the instruction to begin measurement and, in response, provide a measurement indicator 1004 that includes a measured distance between the user's fingers 200b, a measurement line 1004a corresponding to a finger 200b on a first of the user hands 200a, and a measurement line 1004b corresponding to a finger 200b on a second of the user hands 200.

In the example illustrated in FIG. 10a, measurement indicator 1004 including the measurement line 1004a and the measurement line 1004b are measurement graphical information that is provided by the display engine using the user hands 200a and fingers 200b included in one or more images taken of the field of view of the user 200. The display engine uses the sizes of the user hands 200a and fingers 200b in the image of the field of view of the user, along with the calibration information determined based on the calibration using the calibration object 900 discussed above, to determine the distance between the fingers 200b on the user hands 200a. That calculation allows the display engine to display the measurement indicator 1004 including the measurement line 1004a corresponding to a finger 200b on a first of the user hands 200a, and the measurement line 1004b corresponding to a finger 200b on a second of the user hands 200.

In an embodiment, as the user 200 moves their hands 200a and fingers 200b apart (e.g., in opposite directions A and B towards the edges of the physical object 1002), the display engine may continuously receive images from the camera on the wearable user device 202. The display engine may then use those images (which include the hands 200a and fingers 200b of the user 200) to determine a measurement distance between the fingers 200b of the user 200, and modify the display of the measurement indicator 1004 including the measurement line 1004a and the measurement line 1004b such that measurements lines 1004a and 1004b move apart from each other and the measurement indicator 1004 indicates the increasing measurement distance determined between the measurement lines 1004a and 1004b. Thus, the user 200 may use the fingers 200b on their hands 200a to determine a measurement of a length of an edge of the physical object 1002.

Figure 10B:
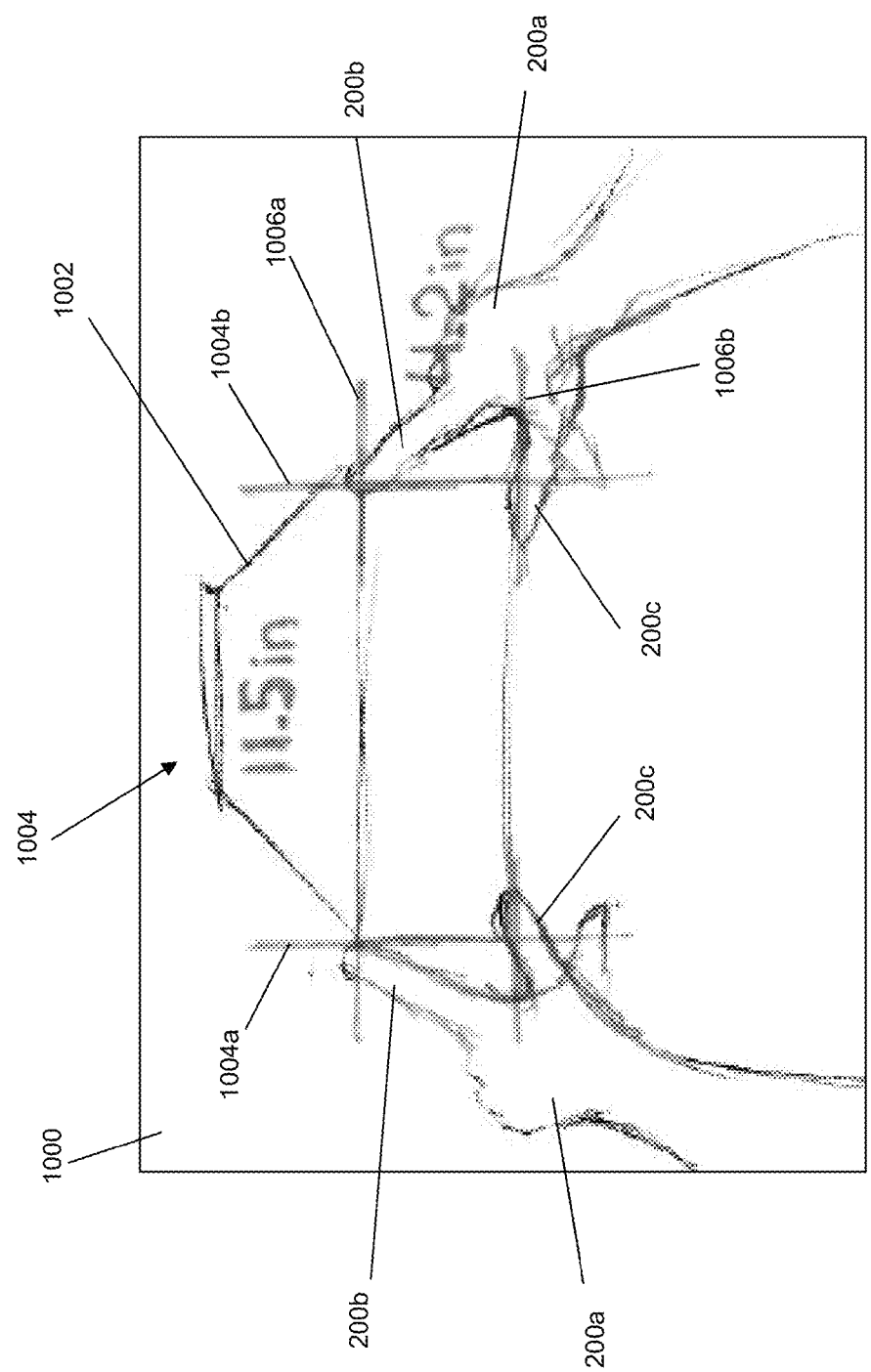
FIG. 10b is a screen shot view illustrating an embodiment of the display of graphical information according to a user field of view.

Referring now to FIG. 10b, the user 200 may manipulate the fingers 200b and thumbs 200c on their hands 200a to measure more than one dimension on the physical object 1002. As illustrated in FIG. 10b, the user 200 has moved their hands 200a and fingers 200b apart relative to the embodiment illustrated in FIG. 10a as discussed above, and then moved their fingers 200b and thumbs 200c such that their fingers 200b on opposite hands 200a are touching the opposite corners on a top edge of the physical object 1002, and their thumbs 200c on opposite hands 200a are positioned adjacent the a bottom edge of the physical object 1002 that is opposite its top edge. In one example, the wearable user device 202 may recognize the instruction to begin measurement of more than one dimension (e.g., a voice instruction, the above describe hand, finger, and thumb movements, etc.) and, in response, provide the measurement indicator 1004 that includes the measured horizontal distance (e.g., 11.5 inches in the illustrated embodiment) between the user's fingers 200b, the measurement line 1004a corresponding to a finger 200b on a first of the user hands 200*a*, the measurement line 1004*b* corresponding to a finger 200*b* on a second of the user hands 200, and in addition, a measured vertical distance (e.g., 4.2 inches in the illustrated embodiment) between the user's fingers 200*b*, a measurement line 1006*a* corresponding to the fingers 200*b* on the user hands 200*a*, and a measurement line 1006*b* corresponding to the thumbs 200*c* on the user hands 200.

In the example illustrated in FIG. 10*b*, measurement indicator 1004 including the measurement line 1004*a*, the measurement line 1004*b*, the measurement line 1006*a*, and the measurement line 1006*b* are measurement graphical information that is provided by the display engine using the user hands 200*a*, fingers 200*b*, and thumbs 200*c* included in one or more images taken of the field of view of the user 200. The display engine uses the sizes of the user hands 200*a*, fingers 200*b*, and thumbs 200*c* in the image of the field of view of the user, along with the calibration information determined based on the calibration using the calibration object 900 discussed above, to determine the horizontal distance between the fingers 200*b* on the user hands 200*a*, as well as the vertical distance between the fingers 200*b* and thumbs 200*c* on the user hands 200*a*. That calculation allows the display engine to display the measurement indicator 1004 including the measurement line 1004*a* corresponding to a finger 200*b* on a first of the user hands 200*a*, and the measurement line 1004*b* corresponding to a finger 200*b* on a second of the user hands 200, the measurement line 1006*a* corresponding to the fingers 200*b* on the user hands 200*a*, and a measurement line 1006*b* corresponding to the thumbs 200*c* on the user hands 200*a*.

In an embodiment, as the user 200 moves their hands 200*a*, fingers 200*b*, and thumbs 200*c* apart (e.g., in the opposite directions A and B towards the edges of the physical object 1002 as illustrated in FIG. 10*a*, extending the finger 200*b* and thumb 200*c* on a hand 200*a* apart, etc.), the display engine may continuously receive images from the camera on the wearable user device 202 and use those images (which include the hands 200*a*, fingers 200*b*, and thumbs 200*c* of the user 200) to determine the horizontal measurement distance between the fingers 200*b* of the user 200 and the vertical measurement distance between the fingers 200*b* and thumbs 200*c* of the user 200, and modify the display of the measurement indicator 1004 including the measurement line 1004*a*, the measurement line 1004*b*, the measurement line 1006*a*, and the measurement line 1006*b* such that measurements lines 1004*a* and 1004*b* move apart from each other, the measurement lines 1006*a* and 1006*b* move apart from each other, and the measurement indicator 1004 indicates the horizontal measurement distance determined between the measurement lines 1004*a* and 1004*b* and the vertical measurement distance between the measurement lines 1006*a* and 1006*b*. Thus, the user 200 may use the fingers 200*b* and thumbs 200*c* on their hands 200*a* to determine a measurement of a length and width of the physical object 1002.

The display engine may also determine measurement distances in 3 dimensions using the calibration information determined based on the calibration using the calibration object 900 discussed above, along with image captured by the camera on the wearable user device 202. For example, using the physical object 1002 illustrated in FIG. 10*b*, rather than positioning the hands 200*a*, fingers 200*b*, and thumbs 200*c* along a common surface of the physical object 1002, the user 200 may position the finger 200*b* and thumb 200*c* on a first hand 200*a* around a corner adjacent a top surface of the physical object 1002, and position the finger 200*b* and thumb 200*c* on a second hand 200*a* around an opposite corner on the physical object 1002 that is adjacent a bottom surface of the physical object 1002. The display engine may then use image recognition techniques to recognize the 3-dimensional nature of the physical object 1002, along with the calibration information including the known size of the users hand 200*a*, fingers 200*b*, and thumbs 200*c*, to provide measurement indicators and distances for a length, width, and height of the physical object 1002.

Figure 10C:
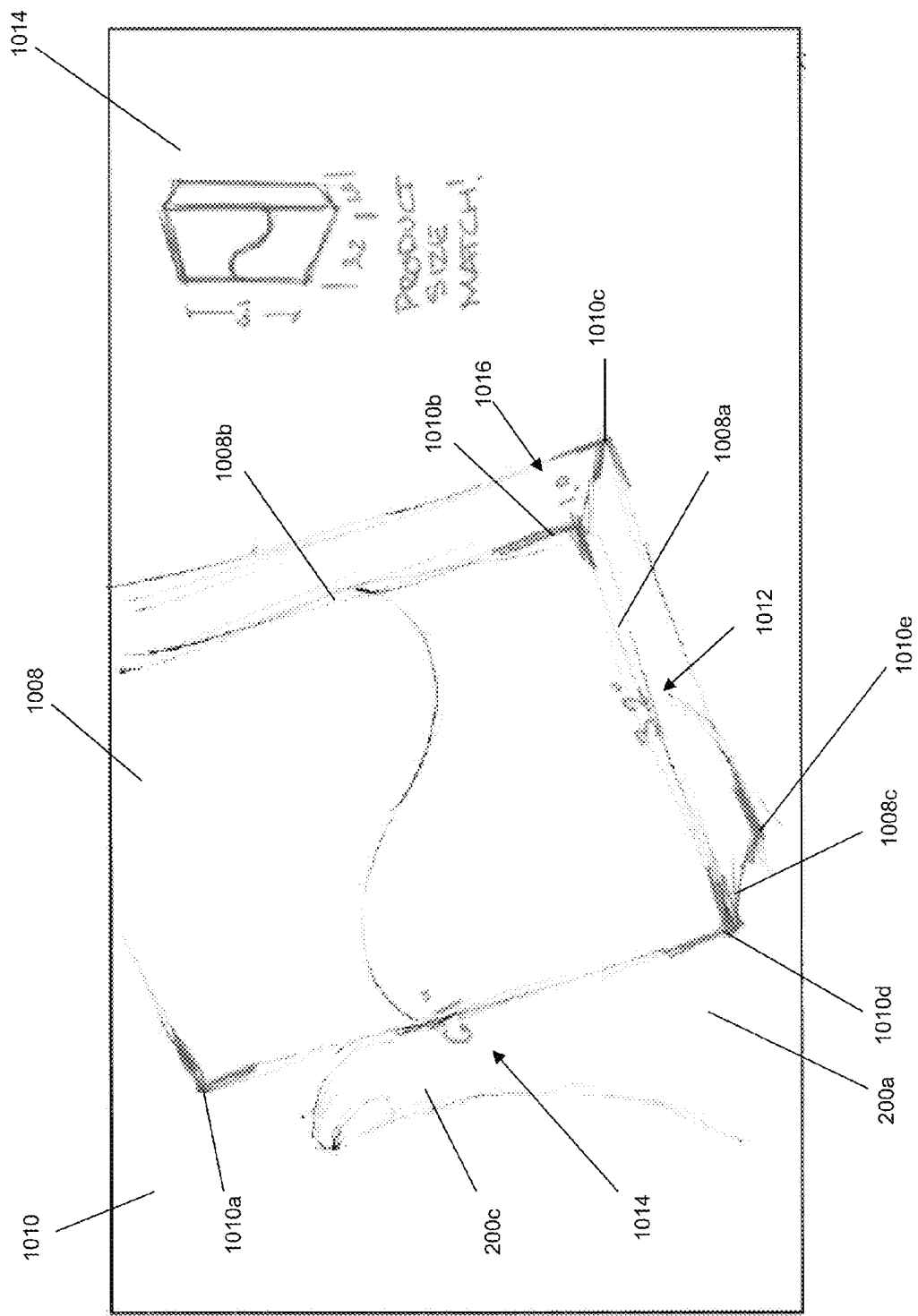
FIG. 10c is a screen shot view illustrating an embodiment of the display of graphical information according to a user field of view.

Referring now to FIG. 10*c*, another example of 3-dimensional measurement is illustrated. In this embodiment, the user 200 is using their hand 200*a* to hold a physical object 1008 such that their thumb 200*c* is visible. As discussed above, the display engine may determine measurement distances in 3 dimensions using the calibration information determined based on the calibration using the calibration object 900 discussed above, along with images captured by the camera in the wearable user device 202. For example, image recognition techniques may be used by the display engine to recognize the edges of the physical object 1008 including a length edge 1008*a*, a height edge 1008*b*, and a width edge 1008*c*. Using that image recognized information and the known size of the thumb 200*c* of the user 200, a measurement graphical information screen 1010 may be provided on the display device 202*a* that includes a plurality of corner measurement indicators 1010*a*, 101*b*, 1010*c*, 1010*d* and 1010*e* that are displayed over the user's field of view of the physical object 1008 to indicate where the display engine detects the corners of the physical object 1008, along with a length measurement 1012 (e.g., 3.2 inches in the illustrated embodiment), a height measurement 1014 (e.g., 6.1 inches in the illustrated embodiment), and a width measurement 1016 (e.g., 1.0 inches in the illustrated embodiment).

In some embodiments, the wearable user device 202 may use the measurements determined to display the measurement graphical information screen discussed above to provide other information to the user 200. For example, in the embodiment illustrated in FIG. 10*c*, the display engine has used the length measurement 1012, height measurement 1014, and width measurement 1016 of the physical object 1008, as well as the images of the physical object 1008, to query a database of products (e.g., in a merchant device) to determine whether the measurements of the physical object 1008 match expected measurements in the database. In the illustrated embodiment, a match indicator 1014 is being displayed on the measurement graphical information screen 1010 that indicates that the physical object 1008 being held by the user 200 matches the dimensions of a product stored in the database.

Figure 10D:
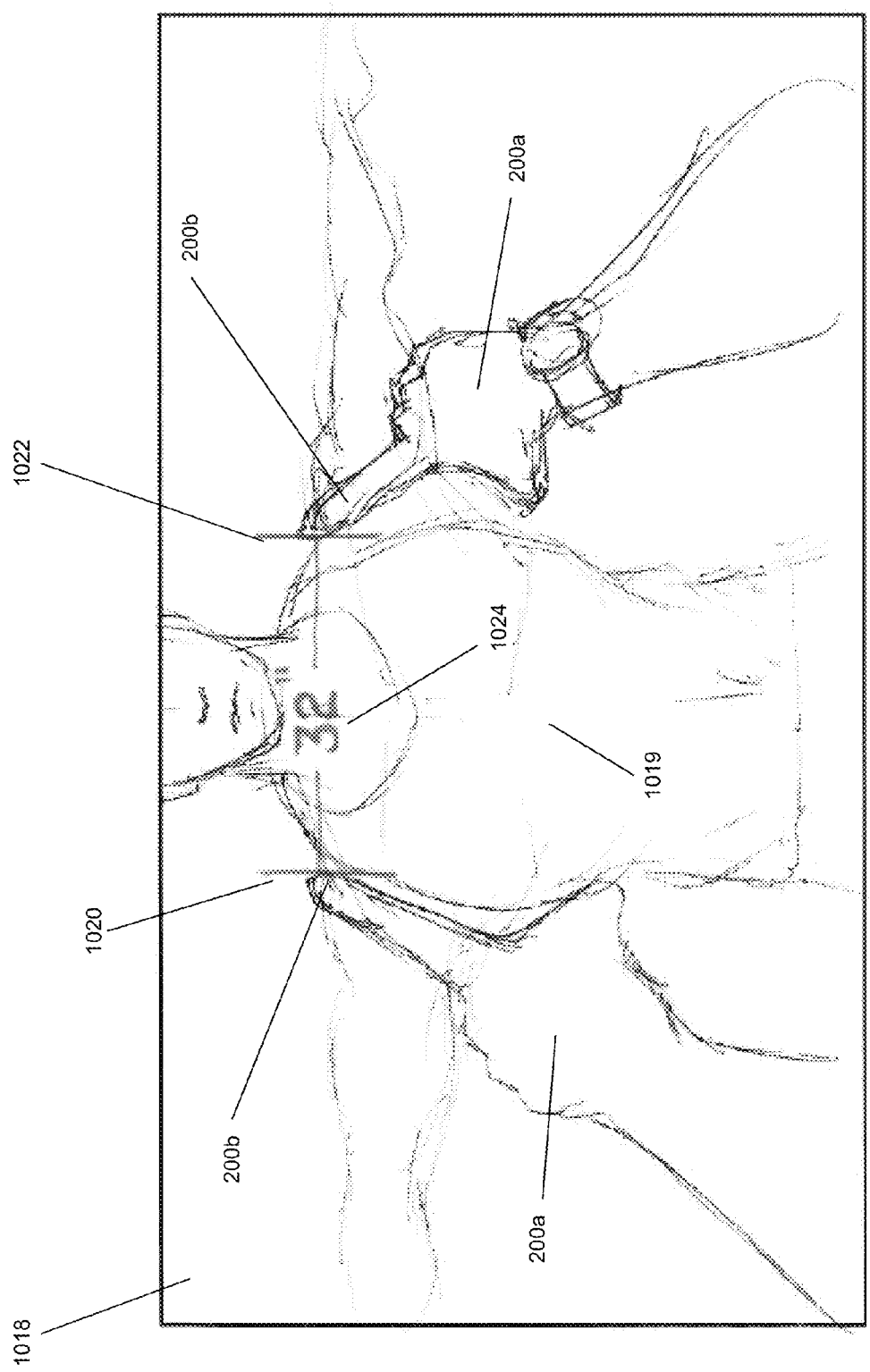
FIG. 10d is a screen shot view illustrating an embodiment of the display of graphical information according to a user field of view.

Referring now to FIG. 10*d*, a measurement graphical information screen 1018 is illustrated that may be displayed on the display device in substantially the same manner as discussed above for the measurement graphical information screen 1000 of FIG. 10*a*. In the embodiment illustrated in FIG. 10*d*, a physical object 1019 (e.g., a person) is located opposite the display device 202*a* from the user 200, and the user 200 is using the fingers 200*b* on each hand to measure a distance on the physical object 1019 (e.g., a distance between the person's shoulders). The display engine is displaying measurement indicators 1020 and 1022 for the fingers 200*b* on each hand 200*a* of the user, and a measurement distance 1024 that is determined based on the calibration using the calibration object 900 as detailed above. As discussed with reference to FIG. 10*a*, the user 200 may move their hands 200*a* and fingers 200*b* relative to each other such that the display of the measurement indicators 1020 and 1022 are moved and the measurement distance 1024 changes until the user is displayed a measurement distance of a desired feature on the physical objet 1019. In some situations, the fingers 200a of the user 200 may be touching the physical object 1019 to provide the measurement distance 1024 displayed. In other embodiments, the physical object 1019 may be a distance away from the fingers 200b of the user 200, and other calibration techniques discuss herein may be leveraged to determine an accurate measurement of the physical object (e.g., the person may include a secondary calibration object around their neck, as discussed above with reference to 4a, 4b, and 5, such that the display engine may determine how far away the person is from the user's fingers 200b, and thus how the measurement distance 1024 between the user's fingers 200b corresponds to the portion of the person in the user's field of view that is between the user's fingers 200b).

Figure 11:
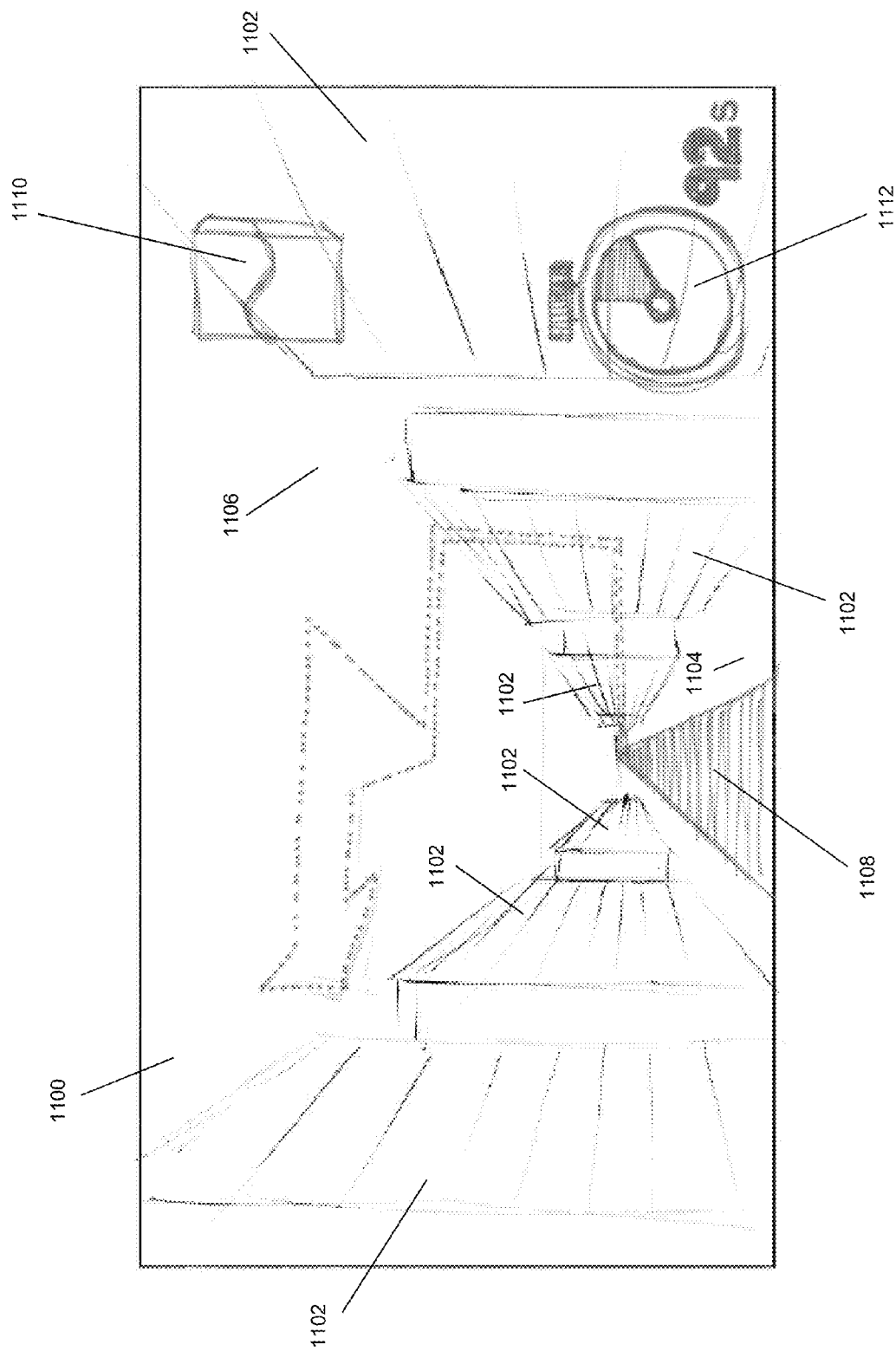
FIG. 11 is a screen shot view illustrating an embodiment of the display of graphical information according to a user field of view.

Referring now to FIG. 11, a graphical information screen 1100 is illustrated being displayed over a user field of view that includes physical objects such as shelving units 1102, a floor 1104, and a ceiling 1106. The graphical information screen 1100 may be provided using calibration information obtained using any of the systems and methods described above. In the illustrated embodiment, the wearable user device 202 is being worn by a user 200 that has be tasked with retrieving a product within a predetermined amount of time (e.g., a worker in a warehouse retrieving a product requested by a customer). In response, the display engine has searched a database for the product and determined a product physical location (e.g., in the warehouse), along with a user location, and provided graphical information on the display device including a perspective enhanced direction graphic 1108 that details directions between the user and the product (e.g., within the warehouse), a product graphic 1110 that illustrates the product to the user 200, and a timing graphic 1112 that shows the user 200 how long they have to retrieve the product.

In the illustrated embodiment, the perspective enhanced direction graphic 1108 provides directions (e.g., through the warehouse) that are based on a known layout of the physical location such that the perspective enhanced direction graphic 1108 extend along the floor 1004, around the shelving units 1102 (displayed on the display device as ghost lines over the shelving units 1002), and up to another floor that is above the ceiling (also displayed on the display device as ghost lines over the ceiling 1006). As can be seen, the perspective enhanced direction graphic 1108 displayed by the ghost lines over the ceiling 1006 provide perspective indicators to indicate that the product being searched for is approximately located on a floor above the current location of the user 200 and directly above that location. The user 200 may then follow the perspective enhanced direction graphic 1108 to the product, use the product graphic 1110 to confirm the product found, and watch the timing graphic 1112 to ensure that the product is being retrieved in the desired amount of time.

Figure 12:
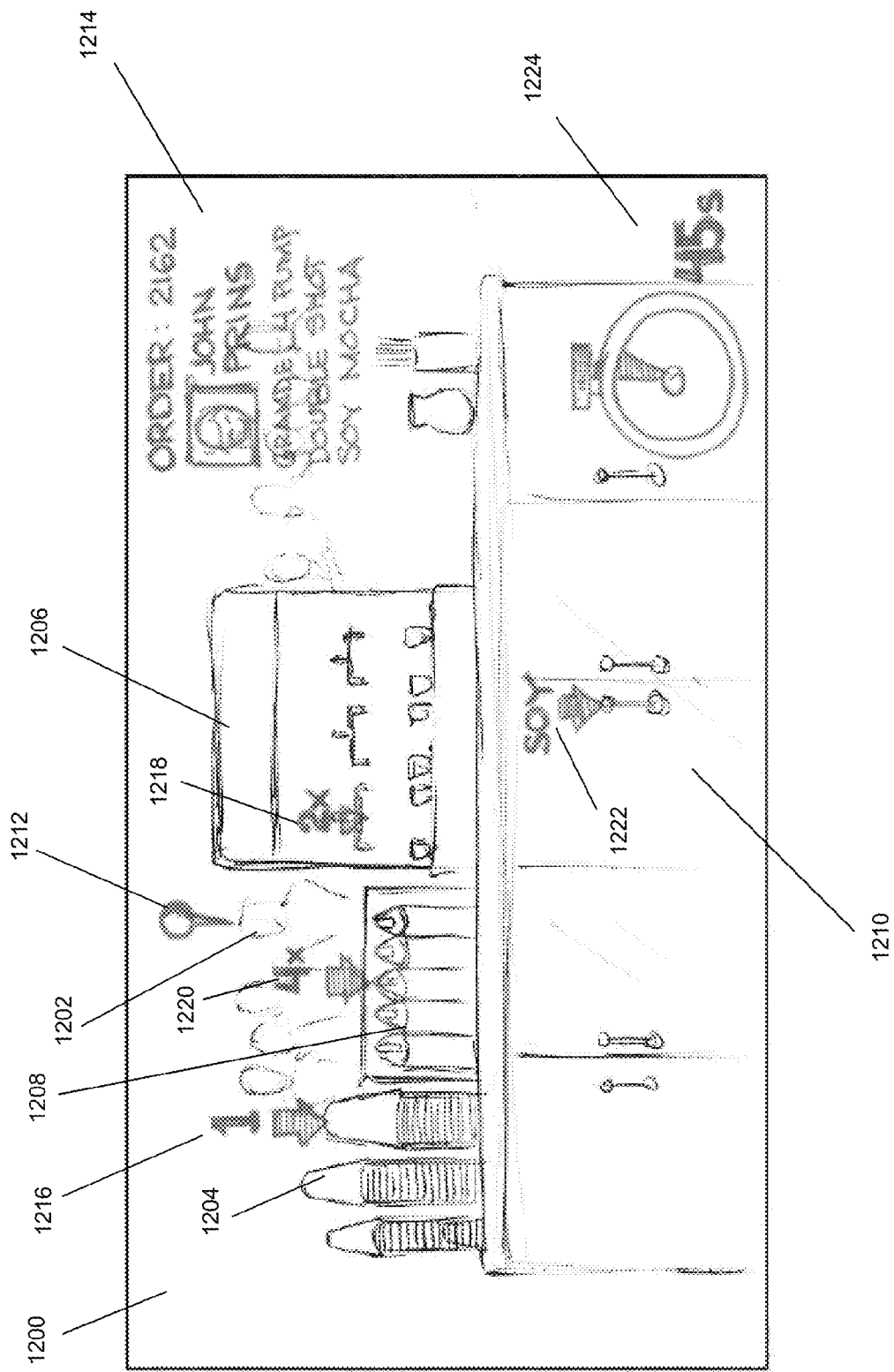
FIG. 12 is a screen shot view illustrating an embodiment of the display of graphical information according to a user field of view.

Referring now to FIG. 12, a graphical information screen 1200 is illustrated being displayed over a user field of view that includes physical objects such as a customer 1202, cups 1204, a drink machine 1206, drink ingredients 1208, and storage cabinets 1210. The graphical information screen 1200 may be provided using calibration information obtained using any of the systems and methods described above. In the illustrated embodiment, the wearable user device 202 is being worn by a user 200 that has been tasked with making a drink for the customer 1202 within a predetermined amount of time (e.g., an employee in a coffee shop making a coffee requested by a customer). In response, the display engine may have used image recognition techniques to identify and track the customer 1202 and, in response, provide a customer indicator 1212 on the display device that is displayed over the user's view of the customer 1202 wherever the customer 1202 is in the user's field of view. In addition, the display engine may use the determined identity of the customer 1202 (e.g., through image recognition techniques, from information retrieved when the customer made a purchase, etc.) to retrieve customer information and provide a customer information window 1214 on the display device 202a that includes an order number for the customer 1202, a photo of the customer 1202, a name of the customer 1202, and the details of the order of the customer 1202.

In addition, the display engine may use the order information received from the customer, to determine order creation details that detail how the customer's order is created (which may be used to display portions of the customer information window 1214). Those order creation details may be used by the display engine, along with image recognition techniques that identify the cups 1204 by type, to provide a cup indicator 1216 over the appropriate cup for the order of the customer 1202. Those order creation details may also be used by the display engine, along with image recognition techniques that identify the drink machine 1206 and its components, to provide a drink making instruction 1218 over the appropriate portion of the drink machine 1206 such that the user 200 may operate the drink machine (e.g., by using the identified component twice) to create the order of the customer 1202. Those order creation details may also be used by the display engine, along with image recognition techniques that identify the drink ingredients 1208 by type, to provide a drink making instruction 1220 over the appropriate drink ingredient such that the user 200 may add the appropriate drink ingredient (e.g., by providing 4 servings of the identified drink ingredient) to create the order of the customer 1202. Those order creation details may also be used by the display engine, along with information retrieved (e.g., from a database) about the contents and locations of items in the cabinets 1210, to provide a drink making instruction 1222 over the cabinet 1210 such that the user 200 may retrieve the appropriate drink ingredient (e.g., by retrieving soy milk from the cabinet 1210) to create the order of the customer 1202. While not illustrated, the order of the steps in making the customer order may be indicated on the graphical information screen 1200 by enumerating those steps, animating the indicator 1216 and instructions 1218, 1220, and 1222 (e.g., enlarging the indicator/instruction that should currently be performed), and/or using any other ordering chronology instructions known in the art.

The user 200 may also use a timing graphic 1224 displayed on the display device 202a to determine whether the order for the customer 1202 is being made in time. The graphical information screen 1200 illustrates how the wearable user device may be used to enable an user (e.g., like the coffee shop employee in the embodiment provided) to operate efficiently without requiring extensive training, as the wearable user device operates to train "on-the-fly" by displaying in the user's field of view everything that user needs to do to accomplish their job. The intuitive heads-up display substantially reduces the training time needed to get an employee up to speed on the details of their job.

Thus, systems and methods have been described that provide for the enhanced display of information on a display device by creating a variety of graphical and other display information that is presented in a manner that is intuitive to a user, and that augments the user's field of view with graphics and information in a manner that utilizes the users field of view of the physical world to display graphical elements that enable the functionality discussed above.

In some embodiments, the functionality of the wearable user device may be extended using other devices external to the wearable user device. For example, the user 200 may include the wearable user device 202, as well as a phone, a smart watch, and/or a variety of other user devices known in the art. In such embodiments, the wearable user device may be linked (e.g., via Bluetooth® or other wireless technology) with the phone, smart watch, or other external device to provide the user 200 the ability to interact externally with the wearable user device via the phone, smart watch, or other external device. For example, with reference to the embodiments discussed above, the user may use the phone or smart watch to confirm that the user is at an end of a head range of motion during the calibration performed as illustrated in FIGS. 2*a*-*l*. In addition, the user may use the phone or smart watch to interact with the icons displayed as illustrated in FIGS. 3*a* and 3*b*. The user may also use the phone or smart watch to confirm that the user has centered the primary calibration object during the calibration performed as illustrated in FIGS. 4*a* and 4*b*. The user may also use the phone or smart watch to select a customer information window or shopping cart information window illustrated in FIGS. 7 and 8. While a few examples have been provided, a wide variety of external device uses with the wearable user device will fall within the scope of the present disclosure.

Figure 13:
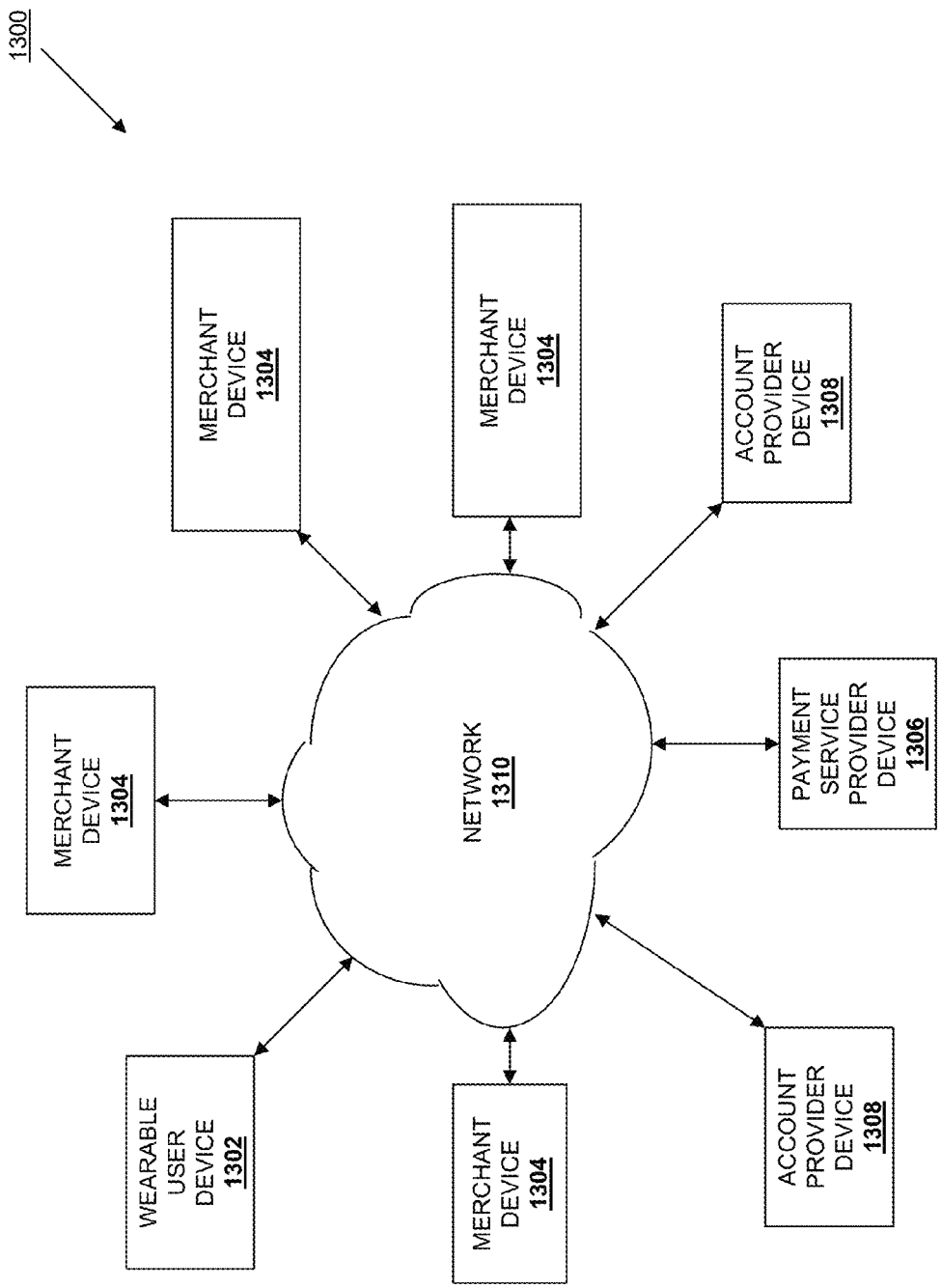
FIG. 13 is a schematic view illustrating an embodiment of a networked system.

Referring now to FIG. 13, an embodiment of a network-based system 1300 for implementing one or more processes described herein is illustrated. As shown, network-based system 1300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 13 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1300 illustrated in FIG. 13 includes a wearable user device 1302, a plurality of merchant devices 1304, a payment service provider device 1306, and a plurality of account holder devices 1308 in communication over a network 1310. The wearable user device 1302 may be the wearable user device 200, discussed above. The merchant devices 1304 may be the merchant devices or other devices discussed above that interact with the wearable user device and may be operated by the merchants discussed above. The payment service provider device 1306 may be the payment service provider devices discussed above and may be operated by a payment service provider such as, for example, PayPal Inc. of San Jose, Calif. The account provider devices 1308 may be the account provider devices discussed above and may be operated by the account providers discussed above such as, for example, credit card account providers, bank account providers, savings account providers, and a variety of other account providers known in the art.

The wearable user device 1302, merchant devices 1304, payment service provider device 1306, and account provider devices 1308 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1300, and/or accessible over the network 1310.

The network 1310 may be implemented as a single network or a combination of multiple networks. For example, in various embodiments, the network 1310 may include the Internet and/or one or more intranets, landline networks, wireless networks, and/or other appropriate types of networks.

The wearable user device 1302 may be implemented using any appropriate combination of hardware and/or software configured for wired and/or wireless communication over network 1310. The wearable user device 1302 may include one or more browser applications which may be used, for example, to provide a convenient interface to permit the user to browse information available over the network 1310. For example, in one embodiment, the browser application may be implemented as a web browser configured to view information available over the Internet.

The wearable user device 1302 may also include one or more toolbar applications which may be used, for example, to provide user-side processing for performing desired tasks in response to operations selected by the user. In one embodiment, the toolbar application may display a user interface in connection with the browser application.

The wearable user device 1302 may further include other applications as may be desired in particular embodiments to provide desired features to the wearable user device 1302. In particular, the other applications may include a payment application for payments assisted by a payment service provider through the payment service provider device 1306. The other applications may also include security applications for implementing user-side security features, programmatic user applications for interfacing with appropriate application programming interfaces (APIs) over the network 1310, or other types of applications. Email and/or text applications may also be included, which allow the user to send and receive emails and/or text messages through the network 1310. The wearable user device 1302 includes one or more user and/or device identifiers which may be implemented, for example, as operating system registry entries, cookies associated with the browser application, identifiers associated with hardware of the wearable user device 1302, or other appropriate identifiers, such as a phone number. In one embodiment, the user identifier may be used by the payment service provider device 1306 and/or account provider device 1308 to associate the user with a particular account as further described herein.

The merchant device 1304 may be maintained, for example, by a conventional or on-line merchant, conventional or digital goods seller, individual seller, and/or application developer offering various products and/or services in exchange for payment to be received conventionally or over the network 1310. In this regard, the merchant device 1304 may include a database identifying available products and/or services (e.g., collectively referred to as items) which may be made available for viewing and purchase by the user or a customer.

The merchant device 1304 also includes a checkout application which may be configured to facilitate the purchase by the payer of items. The checkout application may be configured to accept payment information from the user through the wearable user device 1302, the account provider through the account provider device 1308, and/or from the payment service provider through the payment service provider device 1306 over the network 1310.

Figure 14:
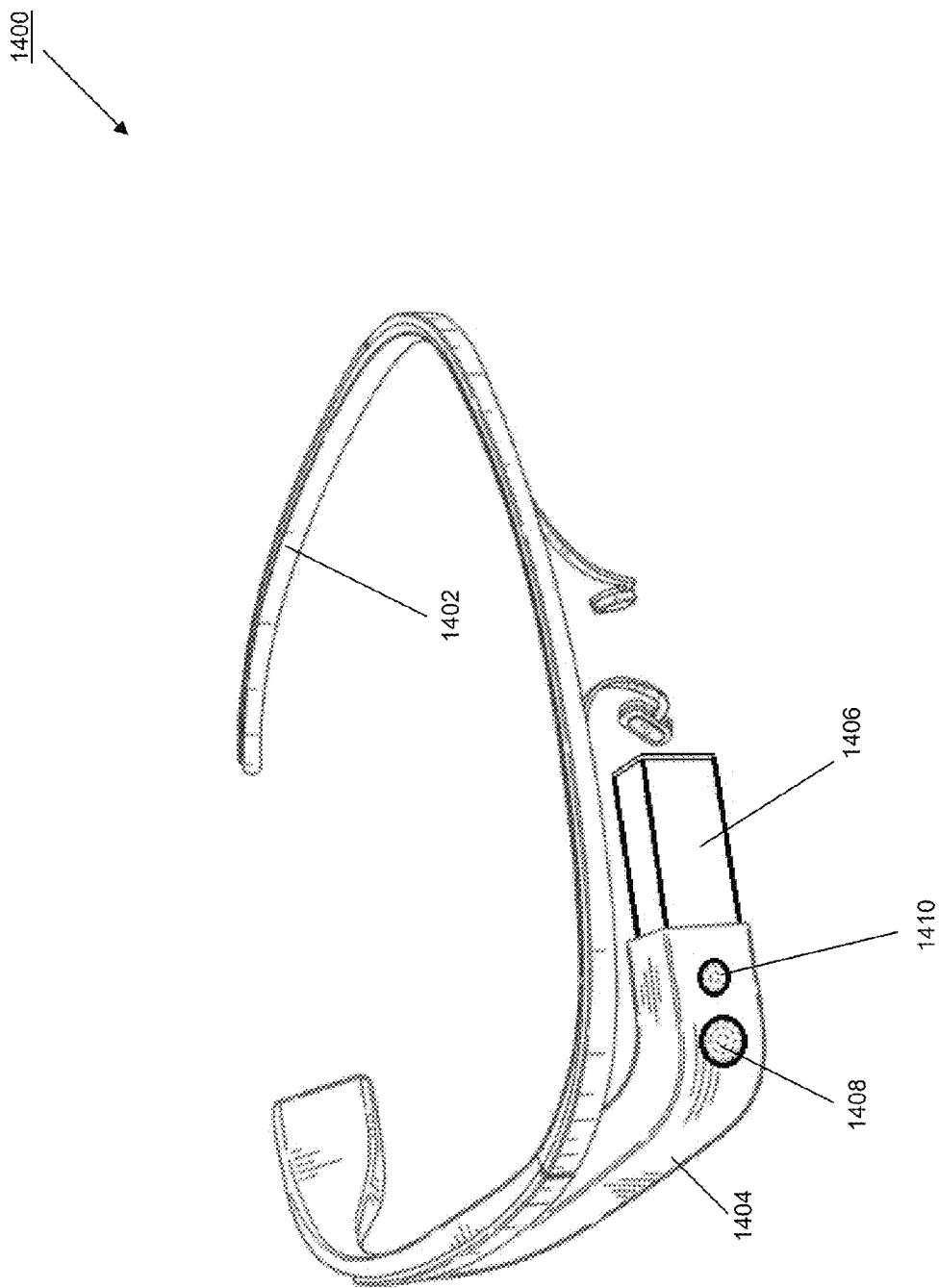
FIG. 14 is a perspective view illustrating an embodiment of a wearable user device.

Referring now to FIG. 14, an embodiment of a wearable user device 1400 is illustrated. The wearable user device 1400 may be the may be the wearable user devices, discussed above. The wearable user device 1400 includes a frame 1402 having a computing chassis 1404 that extends from the frame 1402, a display device 1406 that extends from the computing chassis 1404, a microphone 1408 located on the computing chassis 1404, and a camera 1410 located on the computing chassis 1404. One of skill in the art will recognize that the wearable user device 1400 is a mobile wearable user device such as, for example, Google Glass® available from Google Inc. of Mountain View, Calif. that may provide a user with the functionality discussed above with reference to the method 100. However, a variety of other mobile wearable user devices may be used in the method 100 without departing from the scope of the present disclosure.

Figure 15:
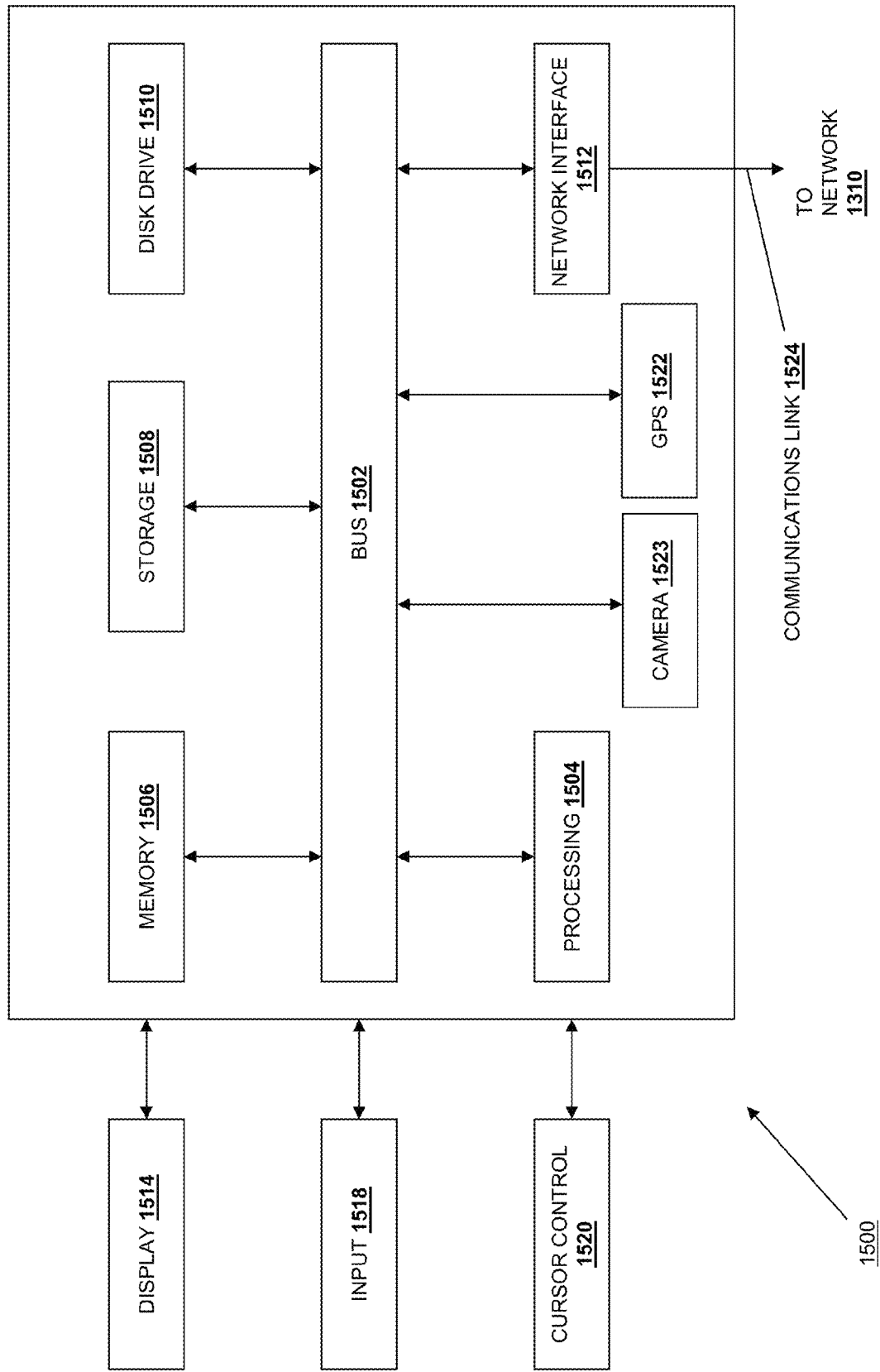
FIG. 15 is a schematic view illustrating an embodiment of a computer system.

Referring now to FIG. 15, an embodiment of a computer system 1500 suitable for implementing, for example, the wearable user device 200, 702, and/or 1400, the merchant device 1304, the payment service provider device 1306, and/or the account provider device 1308, is illustrated. It should be appreciated that other devices utilized by users, merchants, payment service providers, and account providers in the payment system discussed above may be implemented as the computer system 1500 in a manner as follows.

In accordance with various embodiments of the present disclosure, computer system 1500, such as a computer and/or a network server, includes a bus 1502 or other communication mechanism for communicating information, which interconnects subsystems and components, such as a processing component 1504 (e.g., processor, micro-controller, digital signal processor (DSP), etc.), a system memory component 1506 (e.g., RAM), a static storage component 1508 (e.g., ROM), a disk drive component 1510 (e.g., magnetic or optical), a network interface component 1512 (e.g., modem or Ethernet card), a display component 1514 (e.g., CRT or LCD), an input component 1518 (e.g., keyboard, keypad, or virtual keyboard), a cursor control component 1520 (e.g., mouse, pointer, or trackball), and/or a location determination component 1522 (e.g., a Global Positioning System (GPS) device as illustrated, a cell tower triangulation device, and/or a variety of other location determination devices known in the art). In one implementation, the disk drive component 1510 may comprise a database having one or more disk drive components.

In accordance with embodiments of the present disclosure, the computer system 1500 performs specific operations by the processor 1504 executing one or more sequences of instructions contained in the memory component 1506, such as described herein with respect to the wearable user device 200, 1302, and 1400, the merchant device(s) 1304, the payment service provider device 1306, and/or the account provider device(s) 1308. Such instructions may be read into the system memory component 1506 from another computer readable medium, such as the static storage component 1508 or the disk drive component 1510. In other embodiments, hard-wired circuitry may be used in place of or in combination with software instructions to implement the present disclosure.

Logic may be encoded in a computer readable medium, which may refer to any medium that participates in providing instructions to the processor 1504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1510, volatile media includes dynamic memory, such as the system memory component 1506, and transmission media includes coaxial cables, copper wire, and fiber optics, including wires that comprise the bus 1502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1500. In various other embodiments of the present disclosure, a plurality of the computer systems 1500 coupled by a communication link 1524 to the network 1310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1500 may transmit and receive messages, data, information and instructions, including one or more programs (i.e., application code) through the communication link 1524 and the network interface component 1512. The network interface component 1512 may include an antenna, either separate or integrated, to enable transmission and reception via the communication link 1524. Received program code may be executed by processor 1504 as received and/or stored in disk drive component 1510 or some other non-volatile storage component for execution.

Figure 16:
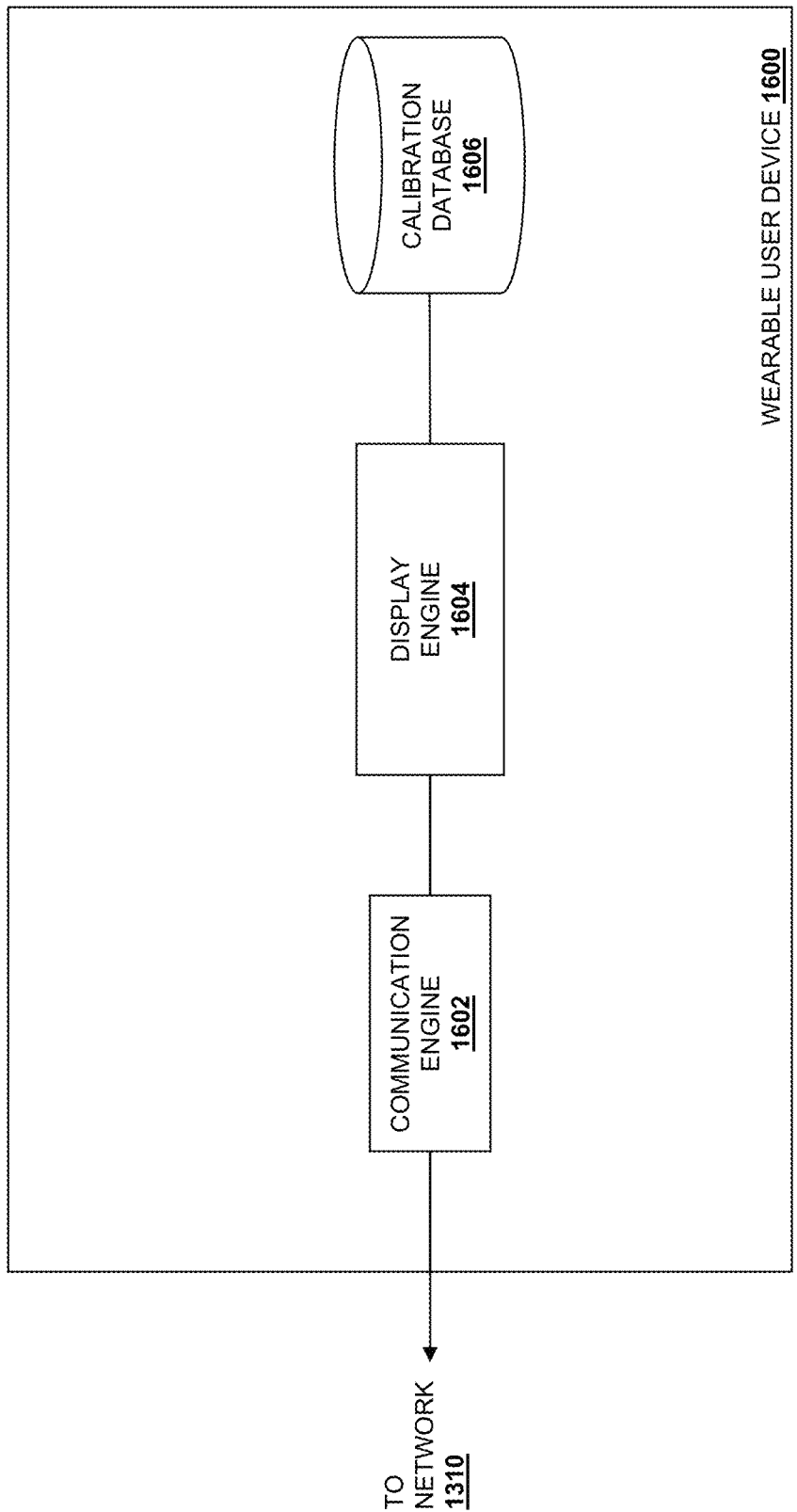
FIG. 16 is a schematic view illustrating an embodiment of a wearable user device.

Referring now to FIG. 16, an embodiment of a wearable user device 1600 is illustrated. In an embodiment, the device 1600 may be the payer device 200, 1302, and 1400. The device 1600 includes a communication engine 1602 that is coupled to the network 1310 and to a display engine 1604 that is coupled to a calibration database 1606. The communication engine 1602 may be software or instructions stored on a computer-readable medium that allows the device 1600 to send and receive information over the network 1310. The display engine 1604 may be software or instructions stored on a computer-readable medium that is operable to determine calibration information and store it in the calibration database 1606, perform field of view calibrations, display graphical information, determine icon details, display icons according to determined icon details, provide perspective enhanced graphical information, determine measurement distances, provide measurement graphical information, and provide any of the other functionality that is discussed above. While the database 1606 has been illustrated as located in the wearable user device 1600, one of skill in the art will recognize that it may be connected to the automatic payment engine 1604 through the network 1310 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to perform operations comprising:
        providing an instruction to a user to perform a field of view calibration reference process with a field of view calibration object and, in response, determining a field of view calibration reference position using information from at least one first image of the field of view calibration object that is captured by a camera and first orientation data received from an orientation determination device:
        providing an instruction to the user to perform a field of view calibration data process with the field of view calibration object and, in response, determining field of view calibration information based on the field of view calibration reference position, information from at least one image of the field of view calibration object that is captured by the camera during at least one head movement over a range of head motion, and second orientation data received from the orientation determination device;
        performing a field of view calibration for the user using the field of view calibration information; and
        displaying graphical information on a display device according to a user field of view based on the field of view calibration.

2. The system of claim 1, wherein the at least one head movement over the range of head motion includes a head pitch movement, a head yaw movement, and a head roll movement, and wherein the information from the at least one image of the field of view calibration object that is captured by the camera during at least one head movement over the range of head motion includes information from images captured at opposite ends of the head pitch movement, the head yaw movement, and the head roll movement.

3. The system of claim 1, wherein the displaying graphical information on the display device according to the user field of view based on the field of view calibration further includes:
    determining at least one icon detail based on the user field of view; and
    displaying at least one icon on the display device according to the at least one icon detail.

4. The system of claim 1, wherein the providing the instruction to the user to perform the field of view calibration reference process with the field of view calibration object includes instructing the user to position themselves a known distance from the field of view calibration object, and wherein the field of view calibration reference position is determined using the information from at least one first image of the field of view calibration object that is captured by the camera, the first orientation data received from the orientation determination device, and the known distance.

5. The system of claim 1, wherein the displaying graphical information on the display device according to the user field of view using the field of view calibration further includes:
    receiving at least one image captured of the user field of view by the camera that includes at least one secondary calibration object; and
    displaying perspective enhanced graphical information on the display device using the at least one secondary calibration object.

6. The system of claim 1, wherein the operations further comprise:
    providing an instruction to the user to perform a hand calibration data process with a hand calibration object and, in response, determining hand calibration information based on information from at least one image that includes a hand of the user and the hand calibration object;
    performing a hand calibration for the user usisng the hand calibration information; and
    displaying graphical information on a display device according to the hand of the user in the user field of view using the hand calibration.

7. A method for calibrating wearable user device to display graphical information, comprising:
    providing an instruction to a user to perform a field of view calibration reference process with a field of view calibration object and, in response, determining a field of view calibration reference position using information from at least one first image of the field of view calibration object that is captured by a camera and first orientation data received from an orientation determination device;
    providing an instruction to the user to perform a field of view calibration data process with the field of view calibration object and, in response, determining field of view calibration information based on the field of view calibration reference position, information from at least one image of the field of view calibration object that is captured by the camera during at least one head movement over a range of head motion, and second orientation data received from the orientation determination device;

performing a field of view calibration for a user of the wearable user device using the field of view calibration information; and displaying graphical information on a display device on the wearable user device according to a user field of view based on the field of view calibration.

8. The method of claim 7, wherein the at least one head movement over the range of head motion includes a head pitch movement, a head yaw movement, and a head roll movement, and wherein the information from the at least one image of the field of view calibration object that is captured by the camera during at least one head movement over the range of head motion includes information from images captured by the camera in the wearable user device at opposite ends of the head pitch movement, the head yaw movement, and the head roll movement.

9. The method of claim 7, wherein the displaying graphical information on the display device on the wearable user device according to the user field of view based on the field of view calibration further includes:
determining at least one icon detail based on the user field of view; and
displaying at least one icon according to the at least one icon detail on the display device on the wearable user device.

10. The method of claim 7, wherein the instruction to the user to perform the field of view calibration reference process with the field of view calibration object includes an instruction to the user to position themselves a known distance from the field of view calibration object, and wherein the field of view calibration reference position is determined using the known distance, the information from the at least one first image of the field of view calibration object that is captured by the camera, and the first orientation data received from the orientation determination device.

11. The method of claim 7, wherein the displaying graphical information on the display device on the wearable user device according to the user field of view based on the field of view calibration further includes:
receiving at least one image captured by the camera on the wearable user device of the user field of view that includes at least one secondary calibration object; and
displaying perspective enhanced graphical information on the display device on the wearable user device using the at least one secondary calibration object.

12. The method of claim 7, further comprising:
providing an instruction to the user to perform a hand calibration data process with a hand calibration object and, in response, determining hand calibration information based on information from at least one image that includes a hand of the user and the hand calibration object;
performing a hand calibration for the user using the hand calibration information; and
displaying graphical information on a display device on the wearable use device according to the hand of the user in the user field of view using the hand calibration.

13. The method of claim 12, wherein the displaying graphical information on the display device on the wearable user device according to the hand of the user in the user field of view using the hand calibration further includes:

receiving at least one image captured by the camera on the wearable user device of the user field of view that includes the both of the user's hands; and
determining, using the hand calibration information, a measurement distance between the user's hands in the at least one image captured by the camera on the wearable user device of the user field of view;
displaying measurement graphical information on the display device on the wearable user device based on the measurement distance.

14. A non-transitory machine-readable medium having stored thereon a plurality of machine-readable instructions executable to cause a machine to perform operations comprising:
providing an instruction to a user to perform a field of view calibration reference process with a field of view calibration object and, in response, determining a field of view calibration reference position using information from at least one first image of the field of view calibration object that is captured by a camera and first orientation data received from an orientation determination device:
providing an instruction to the user to perform a field of view calibration data process with the field of view calibration object and, in response, determining field of view calibration information based on the field of view calibration reference position, information from at least one image of the field of view calibration object that is captured by the camera during at least one head movement over a range of head motion, and second orientation data received from the orientation determination device;
performing a field of view calibration for a user of the wearable user device using the field of view calibration information; and
displaying graphical information on a display device on the wearable user device according to a user field of view based on the field of view calibration.

15. The non-transitory machine-readable medium of claim 14, wherein the at least head movement over the range of head motion includes a head pitch movement, a head yaw movement, and a head roll movement, and wherein the information from the at least one image of the field of view calibration object that is captured by the camera during at least one head movement over the range of head motion includes information from images captured by the camera in the wearable user device at opposite ends of the head pitch movement, the head yaw movement, and the head roll movement.

16. The non-transitory machine-readable medium of claim 14, wherein the the displaying graphical information on the display device on the wearable user device according to the user field of view based on the field of view calibration further includes:
determining at least one icon detail based on the user field of view; and
displaying at least one icon according to the at least one icon detail on the display device on the wearable user device.

17. The non-transitory machine-readable medium of claim 14, wherein the instruction to the user to perform the field of view calibration reference process with the field of view calibration object includes an instruction to the user to position themselves a known distance from the field of view calibration object, and wherein field of view calibration reference position is determined using the known distance, the information from the at least one first image of the field of view calibration object that is captured by the camera, and the first orientation data received from the orientation determination device.

18. The non-transitory machine-readable medium of claim 14, wherein the displaying graphical information on the display device on the wearable user device according to the user field of view based on the field of view calibration further includes:
    receiving at least one image captured by the camera on the wearable user device of the user field of view that includes at least one secondary calibration object; and
    displaying perspective enhanced graphical information on the display device on the wearable user device using the at least one secondary calibration object.

19. The non-transitory machine-readable medium of claim 14, wherein the operation further comprise:
    providing an instruction to the user to perform a hand calibration data process with a hand calibration object and, in response, determining hand calibration information based on information from at least one image that includes a hand of the user and the hand calibration object;
    performing a hand calibration for the user using the hand calibration information; and
    displaying graphical information on a display device on the wearable user device according to the hand of the user in the user field of view using the hand calibration.

20. The non-transitory machine-readable medium of claim 19, wherein the displaying graphical information on the display device on the wearable user device according to the hand of the user in the user field of view using the hand calibration further includes:
    receiving at least one image captured by the camera on the wearable user device of the user field of view that includes both of the user's hands; and
    determining, using the hand calibration information, a measurement distance between the user's hands in the at least one image captured by the camera on the wearable user device of the user field of view;
    displaying measurement graphical information on the display device on the wearable user device based on the measurement distance.

* * * * *